(12) United States Patent
Sapa et al.

(10) Patent No.: US 11,068,469 B2
(45) Date of Patent: Jul. 20, 2021

(54) SYSTEM AND METHOD OF A DYNAMIC SHARED MEMORY HASH TABLE WITH NOTIFICATIONS

(71) Applicant: Arista Networks, Inc., Santa Clara, CA (US)

(72) Inventors: Sebastian Sapa, Vancouver (CA); Duncan Stuart Ritchie, Bowen Island (CA); Jonathan Antusiak, Vancouver (CA); Stephanie Elaine Fung, Burnaby (CA)

(73) Assignee: Arista Networks, Inc., Santa Clara, CA (US)

( * ) Notice: Subject to any disclaimer, the term of this patent is extended or adjusted under 35 U.S.C. 154(b) by 853 days.

(21) Appl. No.: 15/187,698

(22) Filed: Jun. 20, 2016

(65) Prior Publication Data

US 2017/0068700 A1 Mar. 9, 2017

Related U.S. Application Data

(60) Provisional application No. 62/214,608, filed on Sep. 4, 2015.

(51) Int. Cl.
*H04L 12/743* (2013.01)
*G06F 16/23* (2019.01)
(Continued)

(52) U.S. Cl.
CPC ...... *G06F 16/2379* (2019.01); *G06F 16/2365* (2019.01); *H04L 45/7453* (2013.01); *H04L 45/64* (2013.01); *H04L 49/90* (2013.01)

(58) Field of Classification Search
CPC .................. G06F 16/2379; H04L 45/7453
See application file for complete search history.

(56) References Cited

U.S. PATENT DOCUMENTS 6,014,730 A 1/2000 Ohtsu
7,516,196 B1 4/2009 Madan et al.
(Continued)

OTHER PUBLICATIONS

Sullivan, Mark, et al. "Using Write Protected Data Structures to Improve Software Fault Tolerance in Highly Available Database Management Systems", Proceedings of the 17th International Conference on Large Data Bases, Sep. 1, 1991, pp. 171-180, XP055141954, http://www.vlcb.org/conf/1991/P171.PDF, Barcelona, Spain.
(Continued)

*Primary Examiner* — Van H Oberly
(74) *Attorney, Agent, or Firm* — Fountainhead Law Group P.C.

(57) ABSTRACT

A method and apparatus of a device that grows and/or shrinks a table that is shared between a writer and a plurality of readers is described. In an exemplary embodiment, a device receives an entry to be added to the shared table. In response to receiving the entry, the device remaps shared table to add a new storage segment to the shared table. The device further adds the entry to the shared table, where the entry is stored in the new storage segment. In addition, the device updates a shared table characteristic to indicate that the shared table has changed. The device further shrinks the shared table by remapping the table to remove a segment of the table.

36 Claims, 25 Drawing Sheets

(51) Int. Cl.
*H04L 12/715*   (2013.01)
*H04L 12/861*   (2013.01)

(56) References Cited

U.S. PATENT DOCUMENTS

| | | | |
|---|---|---|---|
| 8,099,538 B2 | 1/2012 | Saha et al. | |
| 8,838,539 B1* | 9/2014 | Ashcraft | H04L 49/9005 |
| | | | 707/637 |
| 9,367,251 B2 | 6/2016 | Holbrook | |
| 9,495,114 B2 | 11/2016 | Holbrook | |
| 9,576,038 B1 | 2/2017 | Huang | |
| 2002/0087500 A1 | 7/2002 | Berkowitz | |
| 2003/0126265 A1* | 7/2003 | Aziz | G06F 9/45504 |
| | | | 709/227 |
| 2007/0067349 A1* | 3/2007 | Jhaveri | G06F 16/256 |
| 2007/0233710 A1 | 10/2007 | Passey | |
| 2012/0079212 A1 | 3/2012 | Dantzig | |
| 2014/0025898 A1 | 1/2014 | Iyengar | |
| 2014/0079064 A1* | 3/2014 | Angst | H04L 45/7453 |
| | | | 370/392 |
| 2014/0337593 A1* | 11/2014 | Holbrook | G06F 3/065 |
| | | | 711/162 |
| 2014/0359232 A1 | 12/2014 | Holbrook et al. | |
| 2016/0098432 A1 | 4/2016 | Madany et al. | |
| 2016/0253098 A1 | 9/2016 | Holbrook | |

OTHER PUBLICATIONS

Extended European Search Report for Counterpart European Patent Application No. 14167803.7, dated Oct. 7, 2014.

* cited by examiner

SYSTEM AND METHOD OF A DYNAMIC SHARED MEMORY HASH TABLE WITH NOTIFICATIONS

RELATED APPLICATIONS

Applicant claims the benefit of priority of prior, provisional application Ser. No. 62/214,608, filed Sep. 4, 2015, the entirety of which is incorporated by reference.

FIELD OF INVENTION

This invention relates generally to data networking and more particularly storing a dynamic hash table in shared memory in which the dynamic shared memory hash table can grow and shrink depending on the amount data being stored in the shared memory hash table.

BACKGROUND OF THE INVENTION

A network element can include two different planes that are used to process network traffic, a control plane and a data plane. The data plane receives, processes, and forwards network traffic using various configuration data (e.g., forwarding, security, quality of service (QoS), and other network traffic processing information). For example, for each received packet of the network traffic, the data plane determines a destination address of that packet, looks up the requisite information for that destination in one or more tables stored in the data plane, and forwards the packet out the proper outgoing interface. The control plane gathers the configuration data from different sources (e.g., locally stored configuration data, via a command line interface, or other management channel such as Simple Network Management Protocol (SNMP)) and configures the data plane using the configuration data.

In addition, the control plane will store the configuration data in one or more tables. For example, the network element will store the routing information in a routing table that is used by the data plane. The data plane can further include multiple different hardware forwarding engines. Each of these hardware forwarding engines will use the configuration data from these tables by reading the tables in the control plane and updating local copies of the tables for each of the hardware forwarding engines. The control plane includes a writer that writes the configuration data, where multiple readers for the hardware forwarding engines read this data. A problem that can arise is that one of the multiple readers attempts to read data from one of the tables that the writer is currently updating. For example, if a reader reads data that is concurrently being modified by the writer, the reader may read data that is partially updated and, thus, is not valid data that is usable by the reader.

In addition, the readers are useful for building asynchronous, distributed, cooperating processes. Process logic is triggered upon receipt of attribute notifications delivered via the reader from tables, producing further state changes for other services that correspond to this process. The attribute notifications can include updated configuration data for a process that describes an aspect of a state of the originating process. The tables are a central clearinghouse of state, responsible for storage and delivery to the readers and corresponding processes and services. This notification model is a useful mechanism for distributed software development. For example, one way to use notifications is to build a queue in which every change is recorded as a "key" within the table and its new associated value. However, the performance of this type of implementation supports only limited sized tables. For example, the notification model can adequately support routing tables with up to 16,000 routes and updating 8-10 readers. This model, however, may not be able to support tables up to one million routes and 32 readers. Furthermore, this model is implemented with static sized tables that may be inadequately sized for the current operating state of the network element.

SUMMARY OF THE DESCRIPTION

A method and apparatus of a device that grows and/or shrinks a shared table that is shared between a writer and a plurality of readers is described. In an exemplary embodiment, a device receives an entry to be added to the shared table. In response to receiving the entry, the device remaps the shared table to add a new storage segment to the shared table. The device further adds the entry to the shared table, where the entry is stored in the new storage segment. In addition, the device updates a shared table characteristic to indicate that the shared table has changed. The device is free to shrink the shared table when it removes a segment from the table by remapping the shared memory.

In another embodiment, the device grows and/or shrinks a local reader table that reads from a shared table that is shared between a writer and a plurality of readers. The device receives a notification that a slot in a shared table is available to be read by a reader. The device further retrieves a characteristic of the shared table. In addition, the device determines if a reader local table needs to be changed based on that characteristic. If the characteristic indicates that the reader local table is out of sync with the shared table, the device remaps the reader local table to be in sync with the shared table. Furthermore, the device reads a value from the slot indicated in the notification.

In a further embodiment, the device starts a reader that reads a shared table written to by a writer in the device. The device starts the reader and synchronizes the shared table with a local table stored in the local memory of the reader. The device further determines if the local table is consistent with the shared table. In addition, the device resynchronizes the local table with the shared table if the local table is not consistent with the shared table.

Other methods and apparatuses are also described.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
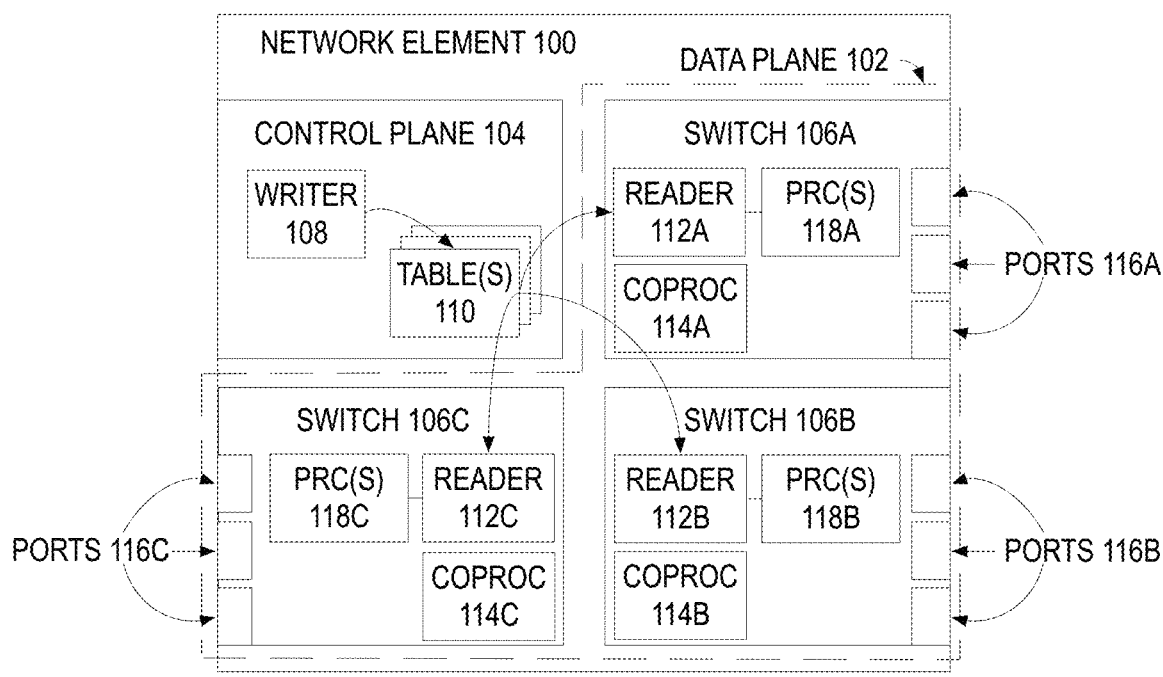
FIG. 1 is a block diagram of one embodiment of a network element that includes a dynamic shared memory hash table with notifications to readers for updates.

A method and apparatus of a device that grows and/or shrinks a shared table that is shared between a writer and a plurality of readers is described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

A method and apparatus of a device that grows and/or shrinks a shared table that is shared between a writer and a plurality of readers is described. In one embodiment, the dynamic shared table with notification provides a mechanism for stateful sharing of tabular data between a writer and multiple readers in a network element. In addition, this dynamic shared table can grow and shrink as the amount of data to be stored increases and/or decreases. This shared table is intended to accelerate data collections (e.g., routing tables, address tables, etc.) with high frequency update rates. In addition, the shared memory hash table can provide high availability and fault tolerance. While in one embodiment, the dynamic shared table is stored in memory as a shared memory table, in alternate embodiments, the dynamic shared table is stored in another medium.

In one embodiment, the dynamic shared table with notification can accelerate a targeted number of collections that are very large, have high update rates, and a relatively large numbers of readers (e.g., a routing table with 1 million entries, a Media Access Control (MAC) address table with 288 k entries and 16 to 32 readers). In one embodiment, the dynamic shared table with notifications operates on the principle of coalescing the notification. In this embodiment, the writers and readers operate independently by running at their own speed, within bounded memory and with an O(1) complexity. In addition, concurrency is handled via wait-free and lock-free data protocols by using 64-bit atomic load/store operations. In this embodiment, atomic read-modify-write variants are not needed. Furthermore, the dynamic shared table does not utilize shared locks, which allows linear scaling of throughput over multiple CPUs as more readers and writers are added. In addition, the dynamic shared table can grow and shrink as needed, depending on the state of the running network element.

In one embodiment, the shared table with notifications does not have a central controlling process. Instead, each writer manages a corresponding shared table, independent of other shared tables. If a writer restarts, the writer state is validated and reconciled from shared memory and the execution of the writer resumes. In one embodiment, the throughput of modified values from a writer to multiple readers scales linearly as readers and writers are added. In this embodiment, there is no blocking synchronization required by the participants, and the threads of execution are lock-free and wait-free. In one embodiment, writes to the shared table are coalesced in-place. In this embodiment, a fast writer does not block or consume unbounded memory because of slow or stuck readers. In addition, writers operate independently of the progress or the state of the readers, and vice versa. In one embodiment, the granularity of change notification is a compound value type consisting of multiple individual attributes value type rather than individual attributes. Thus, the maximum number of notifications that can ever be queued at once is bounded to the number of elements in the table.

In one embodiment, the dynamic shared table mechanism includes three main components: the shared table, the notification queue, and the reader's local shadow table. The writer modifies an entry in the hash table and puts a notification in the notification queue. Readers pull the notification from the queue and populate their local shadow table. In turn, each reader modifies a corresponding process's value collection.

In one embodiment, the hash table notification mechanism is based on the notification of slot identifiers ("slot-ids"), not keys. In one embodiment, a slot is a placeholder for a (key, value) pair. In this embodiment, the (key, value) pairs can come and go in a slot, but the slot-id remains the same. Thus, a notification on a slot indicates to a reader that something in this slot changed and it is up to the reader to figure out the change. Using this slot analogy for the shared table, each entry in the shared table is assigned a slot. So to deliver a notification that a table entry has changed, the writer that modified the table entry delivers the slot identifier. When a reader receives the slot identifier, the slot entry for this slot identifier indexes directly into the shared table to see what changed. In one embodiment, the use of slots to index the shared table is space and cycle efficient, because slot identifiers are simple 32-bit data, compared to an arbitrary size for the key.

In one embodiment, given that each shared table entry corresponds to a slot identifier, the writer can build a notification queue containing slot identifier notifications. In one embodiment, this is the notification queue as described below. In this embodiment, the reader follows this queue and consumes slot identifier notifications, reading the value from the corresponding slot and updating a reader-local shadow copy of the shared memory hash table. These key notifications can then be delivered to the process.

If the shared memory hash table and/or notification queue are fixed sized tables, a network operator would tend to configure these tables for a worst-case scenario (e.g., configure a maximum sized table), so that these tables do not run out of capacity during the running of network element. Configuring these tables to be a maximum size can waste memory, as a network element running with a small forwarding table or other information will not need a shared table that is this large. Furthermore, if the shared table is full, a static sized table cannot grow to store more information. This problem is further compounded if the network element is configured to have multiple virtual routing and forwarding (VRF) instances, because a network operator may allocate multiple maximally sized shared memory hash tables for the multiple VRF instances.

In one embodiment, the dynamic shared table can grow and shrink as needed, depending on the state of running network element. In one embodiment, the bucket and slot tables of the dynamic shared table grow in-place. By growing the tables in-place, a reader does not need to release a reference to the table in order to complete the change in size of these tables. In this embodiment, each of these tables is a memory-mapped file that can be remapped as needed to either grow or shrink that table. For example and in one embodiment, the bucket and slots tables can grow if the number of slots is too small for the amount of (key, value) pairs being stored in the dynamic shared table. In this example, the writer can grow the buckets and slots table in-place without having to notify the readers that these table sizes have changed. As another example and embodiment, the bucket and slots tables can be shrunk if the number of active slots being used falls below a threshold (e.g., less than 25%). In this example, these tables are shrunk in place without having to notify the readers that these tables have changed in size.

In addition, and in one embodiment, the notification queue can also grow and shrink, in-place, as needed. In this embodiment, the notification queue is split into two different queues, a primary and a secondary. These two queues are used when a queue is compacted to recover notification entries for invalidated entries. For example and in one embodiment, if the notification queue becomes full, the secondary queue is grown in-place. The size of the primary can change at the next compaction or growth (as this primary will now be the secondary and visa versa). Alternatively, if the notification queue is too large (e.g., the number of active entries in the queues is below a certain threshold), the queue is compacted and remapped to be smaller.

FIG. 1 is a block diagram of one embodiment of a network element 100 that includes a dynamic shared table with notifications to readers for updates. In FIG. 1, the network element 100 includes a data plane 102 and a control plane 104. In one embodiment, the data plane 102 receives, processes, and forwards network data using various configuration data (e.g., forwarding, security, quality of service (QoS), and other network traffic processing information). For example, for each received packet of the network traffic, the data plane determines a destination address of that packet, looks up the requisite information for that destination in one or more tables stored in the data plane, and forwards the packet out the proper outgoing interface. The data plane 102 includes multiple switches 106A-C, where each switch 106A-C receives, processes, and/or forwards network traffic. In one embodiment, each switch includes an ASIC that is coupled to one or more ports. For example and in one embodiment, the network element 100 is a single logical switch that includes multiple ASICs, where each ASIC is coupled to multiple ports. In this example, each switch 106A-C includes one ASIC and multiple ports (e.g., 24 ports/ASIC). In one embodiment, each switch 106A-C includes a reader 112A-C, co-processor 114A-C, ports 116A-C, and process(s) 118A-C, respectively. In one embodiment, the reader 112A-C reads the data in the tables 110 and stores the data in a local buffer (not illustrated) of the respective switch 106A-C. In this embodiment, each reader 112A-C is notified of new data modification, and the corresponding reader 112A-C performs lock and wait free reads of the data so as to not read data that is in the middle of being modified. Performing a read of a table as a result of being notified is further described in FIG. 11A below. In one embodiment, the co-processor 114A-C is a processor for each switch 106A-C that can be used to accelerate various functions of the switch 114A-C. For example and in one embodiment, the co-processor 114A-C can accelerate bulk reads and write from memory in the control plane 104 to the local buffers. In one embodiment, the ports 116A-C are used to receive and transmit network traffic. The ports 116A-C can be the same or different physical media (e.g., copper, optical, wireless and/or another physical media). In one embodiment, each of the process(s) 118A-C is a component of software that reads the configuration database, interacts with some resource (hardware or a network protocol or some other software component or process, e.g. the operating system kernel), and produces a status of that resource.

In one embodiment, the control plane 104 gathers the configuration data from different sources (e.g., locally stored configuration data, via a command line interface, or other management channel (e.g., SNMP, Simple Object Access Protocol (SOAP), Representational State Transfer type Application Programming Interface (RESTful API), Hypertext Transfer Protocol (HTTP), HTTP over Secure Sockets layer (HTTPs), Network Configuration Protocol (NetConf), Secure Shell (SSH), and/or another management protocol) and writes this configuration data to one or more tables 110. In one embodiment, the control plane 104 includes a writer 108 that writes configuration data to the table(s) 110 by performing wait-free writes and reader notifications, such that a reader reading the data can read data that is not in the middle of being modified. Performing a wait-free write of a table with reader notification is further described in FIGS. 8-10 below.

In one embodiment, each of the one or more tables 110 is a table that is shared between the writer 108 and the readers 112A-C. In this embodiment, the table(s) 110 are stored in memory that is shared between the data plane 102 and the control plane 104. In one embodiment, the tables 110 store configuration data (e.g., forwarding, security, quality of service (QoS), and other network traffic processing information). In this embodiment, the writer 108 adds, deletes, or updates the data stored in the tables 110 and, in addition, notifies the readers 112A-C that there is new data in the tables 110 to be read. The reader 112A-C receives the notification, determines which data has been modified from the notification, and reads this data from the tables 110. In addition, the reader 112A-C updates the corresponding process 118A-C with the modified data. In one embodiment, the writer 108 notifies the reader using a notification queue. In one embodiment, the writer 108 stores the notification at the head of the notification queue for a particular piece of data (e.g., a routing table entry) and invalidates previous notifications in this queue for this particular piece of data. In one embodiment, the shared tables 110 are each a dynamic shared memory hash table. In another embodiment, the shared tables 110 are a different type shared table.

In one embodiment, the network element 100 can include multiple virtual routing and forwarding (VRF) instances. In this embodiment, each VRF instance has distinct routing and/or forwarding information that is different and/or separate from other VRFs. In addition, this further allows a network operator to segment network paths without using multiple devices. If the table(s) 110 are statically configured, there are two problems. One, the table(s) cannot grow so as to store the forwarding information needed for the network element to run. Second, because the table(s) 110 are static, a network operator may configure the table(s) 110 to be sized for a worst-case scenario (e.g., set the table(s) 110 to be a maximum size), even though much of the time, the network element 100 does not take advantage of maximally sized tables. This leads to an inefficient allocation of resources for the network element 100. Having multiple VRF instances further compounds the problem because a network operator may allocate multiple maximally sized tables for the multiple VRF instances.

Figure 2:
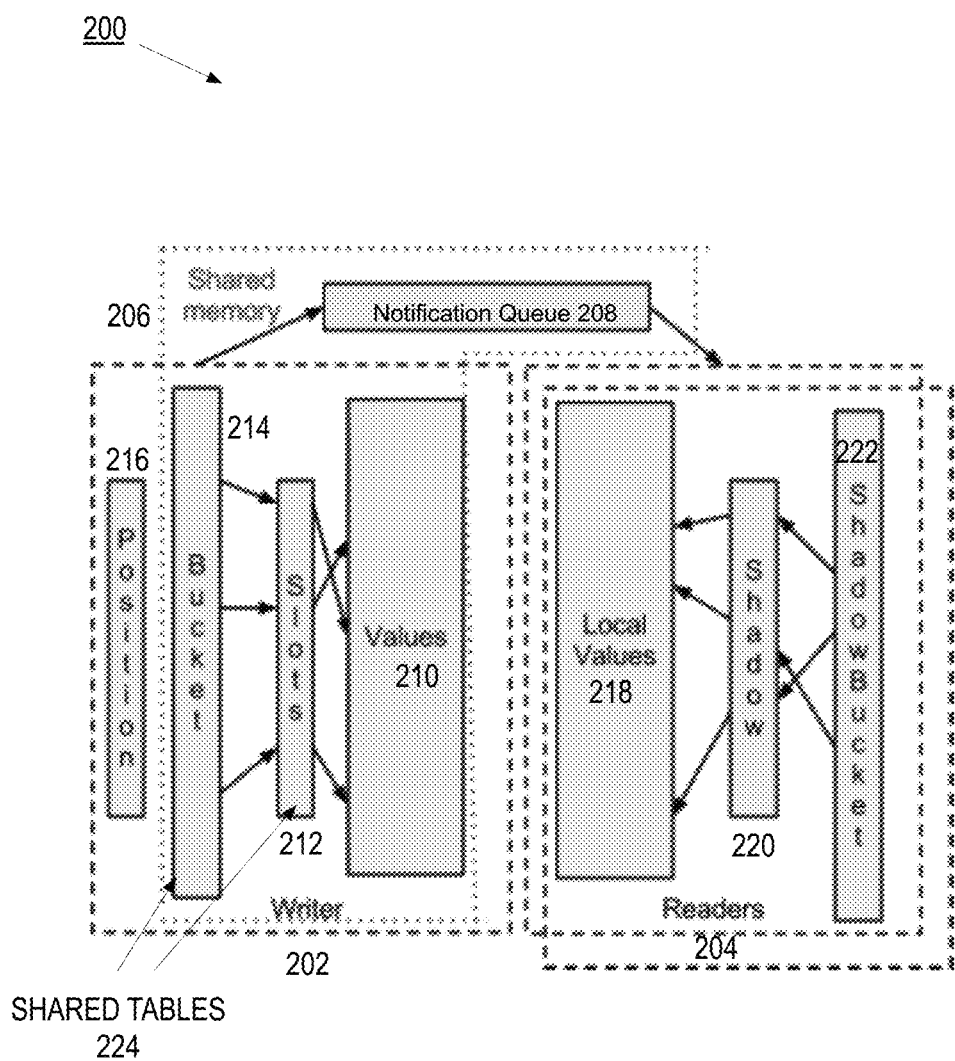
FIG. 2 is a block diagram of one embodiment of a dynamic shared memory hash table with notifications to one or more readers.

In order to overcome the inefficiencies of statically-sized forwarding tables, a network element can have dynamically sized table(s) 110, where these table(s) 110 are shared memory hash tables that includes notifications for readers. FIG. 2 is a block diagram of one embodiment of a dynamic shared memory hash table system 200 with notifications to one or more readers. In FIG. 2, the shared memory hash table system includes a writer 202, one or more readers 204, and the shared memory hash table 206. In one embodiment, the writer 202 writes values to the shared memory hash table 206 using a wait-free write, where each of the values is a (key, value) pair. The shared memory hash table 206 is a data structure used to implement an associative array of entries, which is a structure that can map the data keys to the data values. A hash table uses a hash function to compute an index into an array of entries, from which the correct value can be stored or retrieved. In one embodiment, the shared memory hash table 206 includes a notification queue 208, a bucket table 214, a slots table 212, and values table 210. The shared memory hash table 206 is further described in FIGS. 3-7 below. In one embodiment, the readers 204 each read the values stored in the shared memory hash table 206.

In one embodiment, the shared memory hash table 206 is dynamic because the shared tables and the notification queue of the shared memory hash table 206 can independently grow and/or shrink as needed. In one embodiment, these tables (e.g., the shared tables and/or notification queue) grow and/or shrink in-place without allocating a new table and copying over the contents from the old table to a new table. An "allocated-and-copy" scheme for a table to grow or shrink, creates a new table, copies over the data from the old table, and de-allocates the old table. The "allocate-and-copy" mechanism can consume extra memory, which is further compounded by the "lazy reader" problem. Because each of the tables is written to by a writer and read from multiple readers, de-allocating the old table cannot occur until each of the readers has switched over to the new table. By waiting to de-allocate the table, extra memory for the old table is still being used by the network element. For example, if a table has 100 slots and is doubled, allocating a new 200 slot table before de-allocating the old table will consume 300 slots worth of memory. This extra consumption of memory is further compounded by the "lazy reader" problem. In a notification-based mechanism, a reader does not read the table until notified that an entry in the table is ready to be read by the reader. Certain readers do not read the table very often (e.g., a reader for a command line interface). Thus, a reader may not give up a reference to an old table for quite a while. During this time the old table may grow one, two, three, or more times in which the old table would not be de-allocated. This would lead to an inefficient growth of memory consumption for unneeded tables.

Instead of growing or shrinking these tables using the "allocate-and-copy", in one embodiment, the network element grows these tables in-place without allocating a new table. In this embodiment, if a table needs to be grown, the network element remaps the table to include a new segment for the table. By remapping the table, the network element provides a contiguous range of memory for the writer and/or readers to access the grown table. In addition, the network element updates characteristics of the table, so as to indicate that the table has changed. By indicating that the table has changed, a reader can access these characteristics to determine if the reader needs to updates the information the reader uses to access this table. For example and in one embodiment, the network element updates the number of slots that the table currently holds and a version of the table. By dynamically growing the table in-place, the network element makes more efficient use of the memory usage of the table. In addition, growing the table in place allows for a reader to update the reader's information on the table as needed and the table growing mechanism is not dependent on a reader action to complete the table growth. Growing a table is further described in FIG. 8A below.

In one embodiment, the network element can shrink a table (e.g., the shared tables and/or notification queue). In this embodiment, if the number of active entries in a table falls below a certain threshold, the network element shrinks the table in-place. As with growing a table in-place, shrinking the table in-place make more efficient use of the memory for the table and also is not dependent on a reader action to complete the table shrinkage. While in one embodiment, the network element shrinks the table if the number of active entries is less than 25%, in alternate embodiments, the network element shrinks the table using a different threshold (greater than or less than 25%). In one embodiment, the network element shrinks the table by identifying a segment of the table to shrink and copying active entries from the identified segment to slots in the active segment of the table. Because the location of the active entries has been moved, the network element issues notifications for each entry that was moved. The network element remaps the table so as to shrink the table in-place. In addition, the network element updates characteristics of the table, so as to indicate that the table has changed. By indicating that the table has changed, a reader can access these characteristics to determine if the reader needs to updates the information the reader uses to access this table. For example and in one embodiment, the network element updates the number of slots that the table currently holds and a version of the table. Shrinking a table is further described in FIGS. 9A-B below.

In one embodiment, the shared tables 224 include bucket table 214 and slot table 212. In one embodiment, the bucket table 214 serves as the hash function range: the hashing function will hash a key into a position in the bucket table 214. The bucket table entry contains a versioned offset, linking the bucket to a chain in the slot table 212. The bucket table is further described in FIG. 3 below. In one embodiment, the slot table 212 is an array of slot entries, each entry containing a versioned offset to the key/value data in shared memory, plus a versioned link. The versioned link is used for building hash chains on occupied entries, and for free list management on unoccupied entries. The slot table 212 is further described in FIG. 4 below. In one embodiment, the value table 210 is the region where the value data is stored in shared memory. Each of the versioned offsets in the Slot table reference an entry in the values table 210. In one embodiment, a writer 202 further includes a positions table 216, which is used to locate a slot's position in the notification queue 208. In this embodiment, the positions table 216 is a slot identifier to position table that is maintained privately by the writer to provide a direct lookup of the slot identifier to notification queue mapping. While in this embodiment, the slot table 212 and value table 210 are illustrated as separate tables, in alternative embodiments, the slot table 212 and the value table 210 may be combined into a single "SlotValue" table. In this embodiment, the slot and value are stored in a single table and a lookaside buffer is used to modify the contents of the SlotValue table without allowing readers to see intermediate states of a partially-written value. For example and in one embodiment, the lookaside buffer can be a lookaside buffer as described in U.S. patent application Ser. No. 14/270,122, entitled "System and Method for Reading and Writing Data with a Shared Memory Hash Table", filed on May 5, 2014. The benefit of this embodiment is a reduction in code complexity, cache footprint, and a consummate improvement in runtime speed as there are fewer pointers to maintain, less code to execute, and better cache locality.

In one embodiment, the reader(s) 204 read the data stored in the values table 210 and use this data to update the corresponding process. Each reader 204 includes local values table 218, shadow table 220, and shadow bucket table 222. In one embodiment, the local values table 218, shadow table 220, and shadow bucket table 222 are local snapshots of the value table 210, slot table 212, and bucket table 214, respectively. In one embodiment, a snapshot table is a snapshot of the shared table. In this embodiment, whereas a reader may need to take care when accessing a shared table, the snapshot does not change until the reader specifically copies data from the shared table into the "snapshot" table.

In this embodiment, the snapshot tables allow software (e.g., the readers) that is unaware or unable to deal with the constraints of shared tables to run unmodified within the reading process. For example and in one embodiment, an unsophisticated bit of software may expect that if it reads key K and retrieves value V that if it reads K again immediately it will get value V again. Due to the concurrent operation of the shared memory hash table, repeated reading of this key may not guarantee a retrieval of the same value. In one embodiment, handling with this concurrent operation can require changes to the reader software if, for instance, it was originally written without the shared memory approach in mind. For example and in one embodiment, one approach to sending notifications for a hash table between processes is to send a stream of key-to-value updates (insertion, deletion, or changes) over a network socket. In this embodiment, the local copy within the reader's address space does not changes except when the reader intentionally de-queues updates from the socket. In another embodiment, the hash table in shared memory can change asynchronously, requiring either change in the reader software or some code to produce a snapshot version of the table that does not change asynchronously.

In one embodiment, the local values table 218 is the region where the sanitized version of the value data are stored in shared memory. In one embodiment, the shadow table 220 is a reader-local "shadow" of the shared memory slot table 212. It represents the reader's sanitized copy of the constantly changing slot table 212 state, as updated exclusively by the received slot identifier ("slot-id") notifications. In one embodiment, the shadow table 220 is sized with the same number of N entries, and has matching slot-id indexes. The shadow table 220 is further described in FIG. 5 below. In one embodiment, the shadow bucket table 222 is similar to the bucket table 214 and the shadow bucket table 222 provides a hash index into the shadow slot table 220, so that the reader(s) 204 can perform lookups on their local sanitized state. The shadow bucket table 222 is further described in FIG. 6 below.

In one embodiment, to notify each reader 204 of the changes to the values stored in the values table, the writer 202 stores notifications in the notification queue 208. In one embodiment, the notification queue 208 is a dual shared notification queue for any number of readers, and writers are unaware of any reader state. The notification queue 208 is further described in FIG. 7 below.

As described above, the shared memory hash table 206 is dynamic because the shared tables 224 and notification queue 208 can grow and/or shrink as needed, independently, according to the running state of the network element. In one embodiment, the local tables of the readers, such as the local values table 218, shadow table 220, and shadow bucket table 222 can also dynamically grow and/or shrink, as needed, to correspond to the change of the shared tables 224. Growing and/or shrinking of these tables is further described in FIGS. 3-7 and 11 below.

In one embodiment, each of the shared tables 224 and the notification queue 208 can grow in-place. In this embodiment, each of the shared tables 224 and the notification queue 208 includes multiple components. When the shared tables 224 or the notification queue 208 grows in-place, each of those components grows in-place as well. In one embodiment, if the shared tables 224 grow, each of the bucket table 214 and slots table 212, grows in-place as well. In this embodiment, the values table 212 is dynamic and grows/shrinks using a different mechanism (as described below). Likewise, if the notification queue 208 grows, the primary and secondary queues of the notification queue 208 grow in-place. In one embodiment, each of the shared fixed-224 and the notification queue 208 includes table characteristics. In one embodiment, the table characteristics include a numslots and a version. In this embodiment, the numslots is the number of slots available in the table. This can give a measure of the current size of the table. In one embodiment, each of the shared tables 224 and the notification queue 208 can be independently grown in page-size increments (e.g. grown in 4096 byte increments). In this embodiment, each of the shared tables 224 and the notification queue 208 can start out with an initial size of one system page total, and be grown in page increments as needed (e.g., one page→two pages→four pages→etc.). For example and in one embodiment, there is one page of memory that is allocated among the bucket table 214 and slots table 212. In one embodiment, an amount by which one of the tables is grown can be in a fixed size (e.g., double the size, grow in minimum 50% increments, or some other fixed size increment) or size can be adjustable (e.g., increasing the number of slots in the table by successively larger powers of 2). For each size, numslots is the number of slots that an entry will fit in the current size of the table. In addition, the table characteristics further include a version. In one embodiment, the version is a monotonically increasing integer. In this embodiment, the version is changed upon a growth or shrinkage of one of the tables. The version and, in some embodiments, the numslots value can be used by a reader to determine when either of the shared tables 224 or the notification queue 208 has changed.

In another embodiment, each of the shared tables 224 and the notification queue 208 can be independently shrunk in-place by deleting a segment from each of the component tables. In this embodiment, the deleted segment is accomplished by remapping that component table, as will be discussed below in FIGS. 3-7. After the table is shrunk in-place, the table characteristics 306 are updated. In one embodiment, the numslots is updated and the version is incremented.

In a further embodiment, the reader local tables can grow and/or shrink in-place as well. In this embodiment, if the reader local need to grow and/or shrink the shadow 220 and shadow bucket 222 grow and/or shrink commensurately. In one embodiment, the reader local table is remapped as described in FIG. 11A below.

Figure 3:
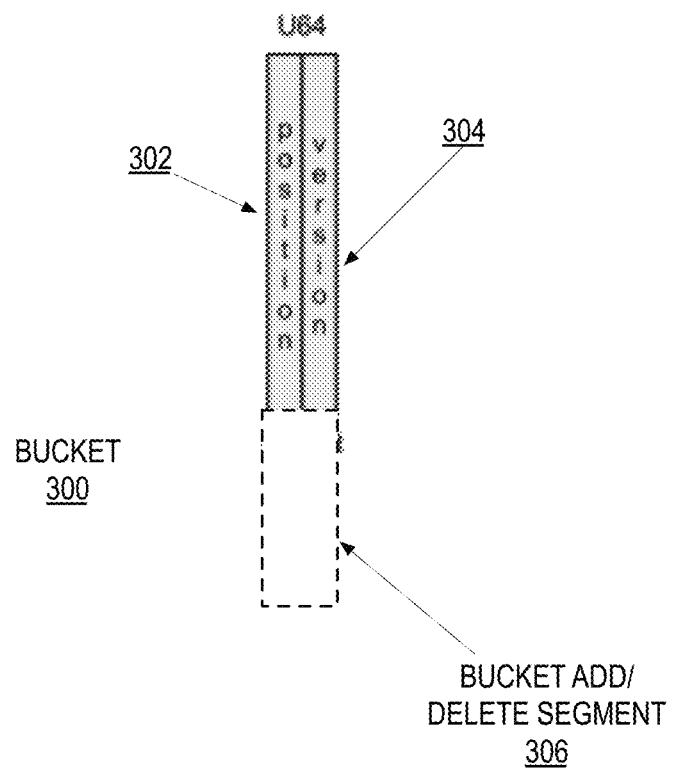
FIG. 3 is a block diagram of one embodiment of a dynamic bucket for the shared memory hash table.

As described above, the shared memory hash table includes a dynamic bucket table. FIG. 3 is a block diagram of one embodiment of a dynamic bucket table 300 of the shared memory hash table. The bucket table 300 serves as the hash function range: the hashing function will hash a key into a position in the bucket table 300. The bucket table entry contains a versioned offset, linking the bucket to a chain in the slot table. In one embodiment, versioned offsets are used in the shared memory hash table data structures. The versioned offsets allow for a lock and wait free mechanism for writers and readers to safely access shared state. For example and in one embodiment, writer and reader use a lock and wait free mechanism as described in U.S. patent application Ser. No. 14/270,226, entitled "System and Method of a Shared Memory Hash Table with Notifications", filed on May 5, 2014.

In one embodiment, the bucket table 300 can grow in-place by adding a segment at the end of the table 300 in response to the shared tables growing in-place. In this embodiment, a bucket add segment 306 is added to the bucket table 300. This additional segment 306 can be used to store additional entries. In another embodiment, the bucket table 300 can shrink in-place by deleting a segment at the end of the table 300 by remapping the table 300. In this embodiment, a segment is identified in the end of the table, such as bucket delete segment 308. Before the segment is deleted, the network element copies the active entries in this bucket delete segment 308 into an active segment of the bucket table 300. Furthermore, because the copied entry locations are changing, the network element issues notifications for the changes to these entries. Similar to the bucket table growth, the bucket table 300 shrinks in increments of page sizes. While in one embodiment, the bucket add and delete segments 306 are illustrated as having the same size, in alternate embodiment, the bucket add and growth segments 306 can be different and have different sizes.

Figure 4:
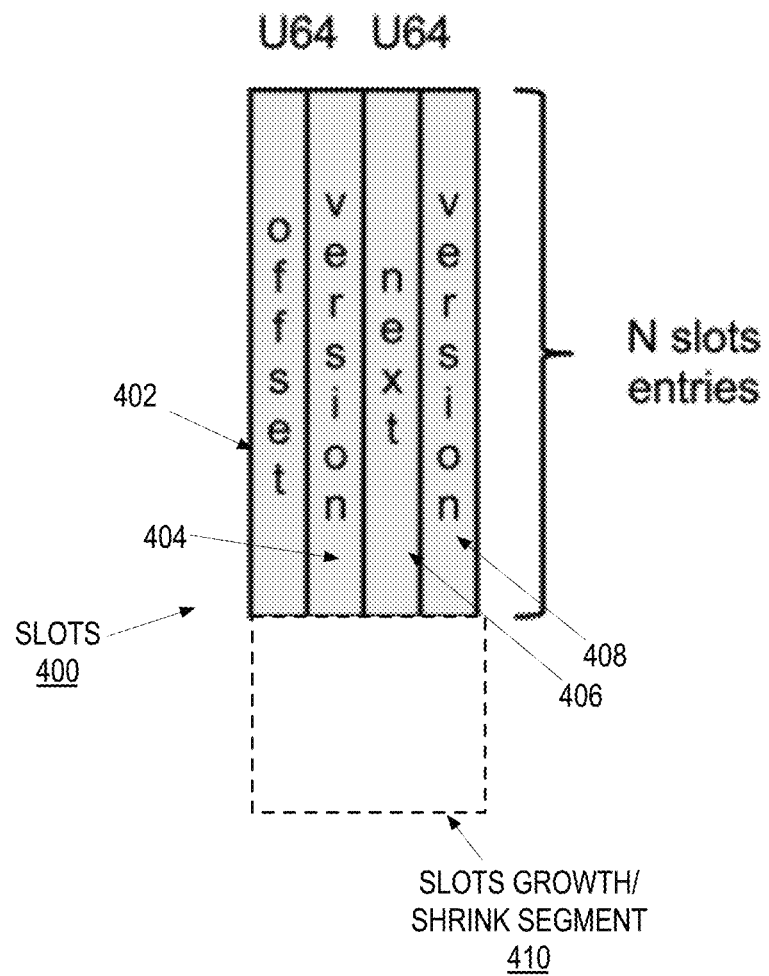
FIG. 4 is a block diagram of one embodiment of a dynamic slot for the shared memory hash table.

Each of the bucket entries can reference a slot entry in a slot table. FIG. 4 is a block diagram of one embodiment of a dynamic slot table 400 for the shared memory hash table. In FIG. 4, the slot table 400 is an array of slot entries, where each entry containing a versioned offset to the key/value data in shared memory, plus a versioned link. The versioned link is used for building hash chains on occupied entries, and for free list management on unoccupied entries.

```
typedef struct {
    uint32_t valueOffset •
    uint32_t valueVersion •
    uint32_t next •
    uint32_t nextVersion •
}
```

In one embodiment, the slot table 400 includes a header that stores the number of slots and a version. In this embodiment, the header is updated atomically upon a growing or shrinking of the slot table 400.

Initially, the slot table 400 has the entries linked onto a writer-owned freelist. When a new key/value is inserted into the table, a slot entry is allocated from the freelist, and the index of the entry being the slot identifier. This automatic allocation and mapping of slot identifiers, used in the notification mechanism, is a feature of this coalesced hashing algorithm. If the newly inserted key/value has collided with an existing slot linked to the bucket, the new allocation is linked to the existing chain in key order. Ordering the chains by key helps preserve important iteration properties (such as no duplicates) and allow for faster key lookup.

In one embodiment, the slots table 400 can grow in-place by adding a segment at the end of the slots table 400 in response to the shared tables growing in-place. In this embodiment, a slots add segment 410 is added to the slots table 400. This additional segment 410 can be used to store additional entries. In another embodiment, the slots table 400 can shrink in-place by deleting a segment at the end of the table 400 by remapping the slots table 400. In this embodiment, a segment is identified in the end of the table, such as slots delete segment 410. Before the segment is deleted, the network element copies the active entries in this slots delete segment 410 into an active segment of the slots table 400. Furthermore, because the copied entry locations are changing, the network element issues notifications for the changes to these entries. Similar to the bucket table growth, the slots table 400 shrinks in increments of page sizes. While in one embodiment, the slots add and delete segments 410 are illustrated as having the same size, in alternate embodiment, the slots add and growth segments 410 can be different and have different sizes.

In one embodiment, the values table is the region where the value data are stored in shared memory. In this embodiment, the versioned offsets in the slot table references the values stored in the values table. In one embodiment, the value types are statically sized, and thus, the values table is a dynamically sized table that can grow and/or shrink depending on the state of the network element. In addition, each entry has a link for a freelist, making entry allocation and deallocation easy. In another embodiment, a dynamically sized value types are used and a dynamic memory allocator is used. In this embodiment, the allocator need not worry about concurrency issues as the readers are not aware of allocator metadata.

Figure 5:
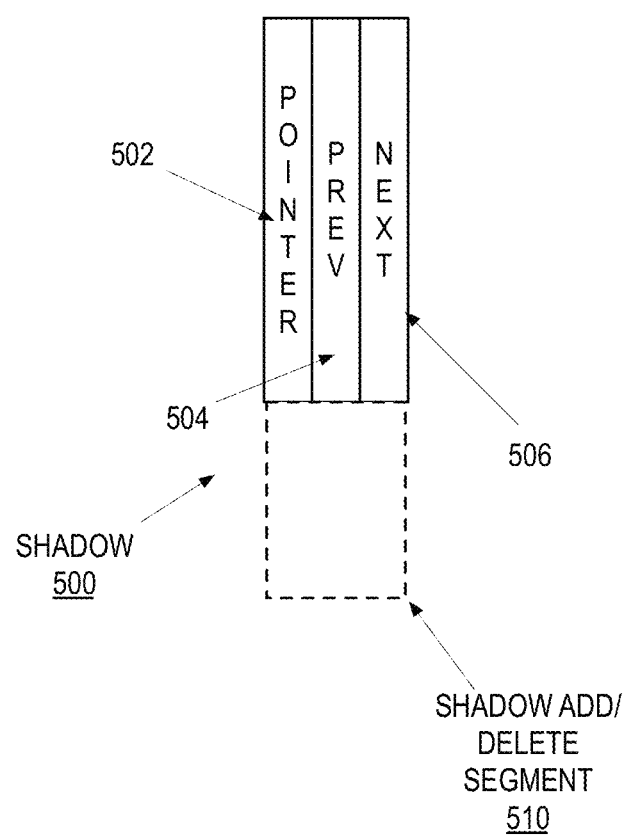
FIG. 5 is a block diagram of one embodiment of a dynamic shadow for the shared memory hash table.

FIG. 5 is a block diagram of one embodiment of a dynamic shadow table 500 for the shared memory hash table. In FIG. 5, the shadow table 500 is a reader-local "shadow" of the shared memory Slot table. It represents the reader's sanitized copy of the constantly changing Slot table state, as updated exclusively by the received slot-id notifications. In one embodiment, the shadow table is sized with the same number of N entries, and has matching slot-id indexes. In one embodiment, each of the entries includes a pointer 502 to a value for the slot, a previous pointer 504 to the previous slot, and a next pointer 506 to the next slot.

When a slot-id notification for slot S is first processed by the reader, the reader compares its shadow slot key in slot S with the slot key in shared memory in slot S:
If the values of the two keys are the same, or if the shadow table entry for slot S is empty, then the key A can be delivered to the process as an update.
If the keys are different, say if key B occupies the shadow slot, the reader knows key B is being deleted and key A is being created. So both keys B and A are delivered to the process as updates (separately, of course).

In either case, prior to delivering any updates to the process, the shadow table is updated to the current state: that is, key A now occupies the shadow slot. The following pseudocode illustrates this algorithm:

```
// retrieve next slot notification
uint32_t slot = conquer.getSlot( ) •
VALUE value •
uint32_t version •
// performs a lockfree
retrieval of key/value at a given slot
do {
    version = slots[ slot ].version •
    value = slots[ slot ].getValue( ) •
} while ( version != slots[ slot ].version ) •
    // retrieve old shadow table key
    KEY shadowKey = shadow[ slot ].getKey( ) •
    // is entry deleted?
    if ( value.isEmpty( ) ) {
    // yes, also delete from shadow index
    deleteShadowEntry( shadowKey ) •
    // tell Process about possibly deleted key
    deliverProcessUpdateFor( shadowKey ) •
} else {
    // is the old shadow key and new key different?
    if ( shadowKey != value.getKey( ) ) {
    // delete old shadow key from table
    deleteShadowEntry( shadowKey ) •
    // yes, deliver old (possibly deleted) key update to
    the Process
    deliverProcessUpdateFor( shadowKey ) •
```

```
}
// insert new key into shadow at given slot
insertShadowEntry( value.getKey( ), slot ) •
// tell Process about changed key/value
deliverProcessUpdateFor( value ) •
}
```

If, as part of the update notification, the process wishes to lookup keys A, B, or any other key in the table, the infrastructure restricts lookups to be local, and not to the shared memory hash table. If the shadow lookup succeeds, then a subsequent lookup into the shared memory hash table can proceed to retrieve the most up-to-date Value. Otherwise the reader risks the "lost delete" race condition. This is one of the reasons why the shadow table maintains a snapshot copy of the keys. For example and in one embodiment, a reader compares the shadow slot with the writer slot and copies the writer copy if different. In this embodiment, readers do local lookups into the shadow table to avoid the 'lost delete' race condition.

Since the shadow table is local to the reader and is accessed by that reader, this shadow table does not need to use versioned offsets. Instead, the shadow table can use local 32-bit pointers to the local key buffer.

In one embodiment, the shadow table 500 can grow in-place by adding a segment at the end of the shadow table 500 in response to a slot notification of an unmapped segment. In this embodiment, a shadow add segment 510 is added to the shadow table 500. This additional segment 510 can be used to store additional entries. In another embodiment, the shadow table 500 can shrink in-place by deleting a segment at the end of the table 500 by remapping the shadow table 500. In this embodiment, a segment is identified in the end of the table, such as shadow delete segment 510. Before the segment is deleted, the network element copies the active entries in this shadow delete segment 510 into an active segment of the shadow table 500. Furthermore, because the copied entry locations are changing, the network element issues notifications for the changes to these entries. Similar to the bucket table growth, the shadow table 500 shrinks in increments of page sizes. While in one embodiment, the shadow add and delete segments 510 are illustrated as having the same size, in alternate embodiment, the shadow add and growth segments 510 can be different and have different sizes.

Figure 6:
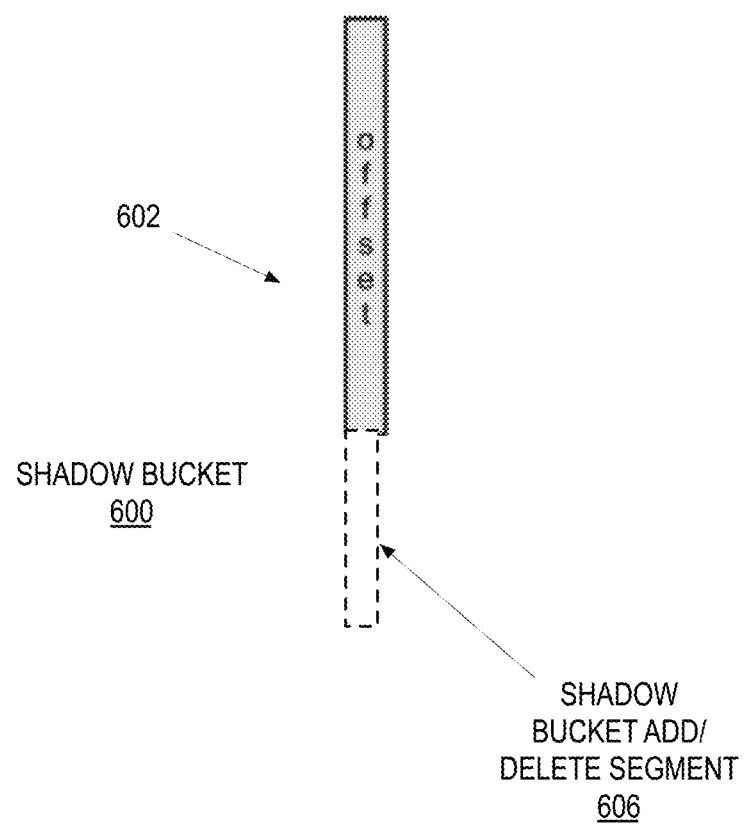
FIG. 6 is a block diagram of one embodiment of a dynamic shadow bucket for the shared memory hash table.

In one embodiment, and in addition to the shadow table, each reader includes a shadow bucket table. FIG. 6 is a block diagram of one embodiment of a dynamic shadow bucket table 600 for the shared memory hash table. In FIG. 6, shadow bucket table 600 provides a hash index into the shadow slot table so that readers can perform lookups on their local sanitized state. The hash function indexes into this table, allowing the lookup to follow the chain. In one embodiment, the shadow table size is dynamically grows and/or shrink depending on the state of the network element.

In one embodiment, this table is private to the reader and it does not reside in shared memory. In this embodiment, because each shadow table 600 corresponds to one reader, the shadow entries do not need a versioned offset.

In one embodiment, the shadow bucket table 600 can grow in-place by adding a segment at the end of the shadow bucket table 600 in response to a reader local table growing in-place. In this embodiment, a shadow bucket add segment 606 is added to the shadow bucket table 600. This additional segment 606 can be used to store additional entries. In another embodiment, the shadow bucket table 600 can shrink in-place by deleting a segment at the end of the table 600 by remapping the shadow bucket table 600. In this embodiment, a segment is identified in the end of the table, such as shadow bucket delete segment 606. Before the segment is deleted, the network element copies the active entries in this shadow bucket delete segment 606 into an active segment of the shadow bucket table 600. Furthermore, because the copied entry locations are changing, the network element issues notifications for the changes to these entries. Similar to the bucket table growth, the shadow bucket table 600 shrinks in increments of page sizes. While in one embodiment, the shadow bucket add and delete segments 606 are illustrated as having the same size, in alternate embodiment, the shadow bucket add and growth segments 606 can be different and have different sizes.

Figure 7:
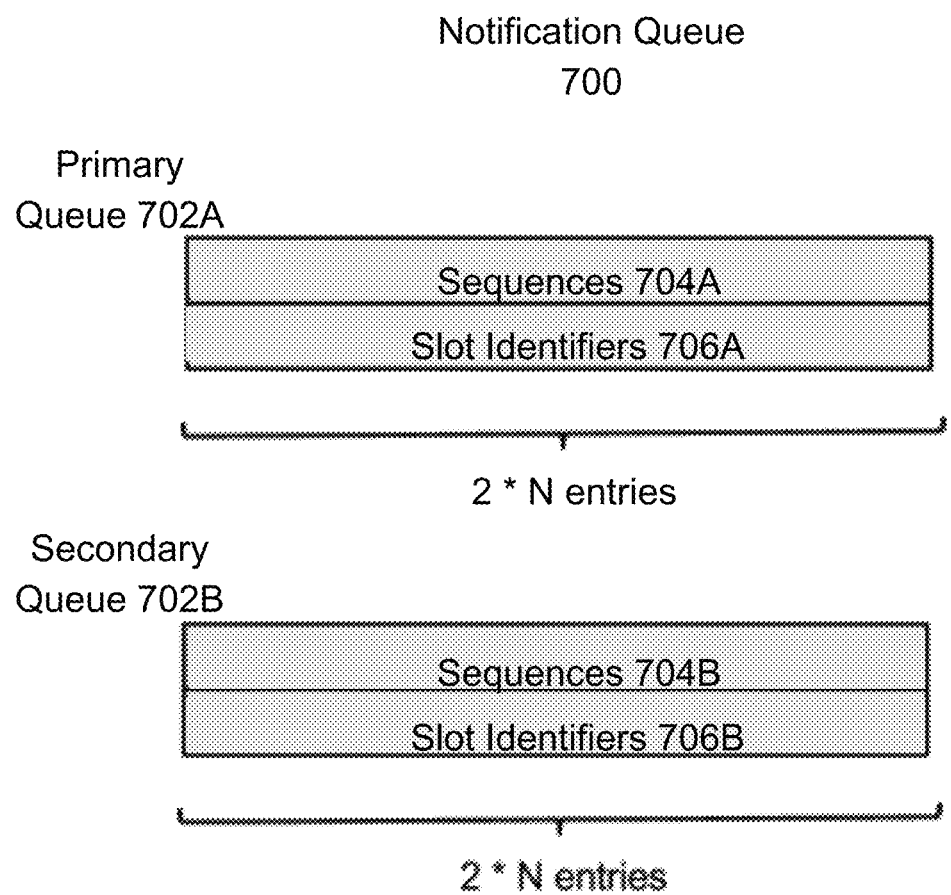
FIG. 7 is a block diagram of one embodiment of a dynamic notification queue for the shared memory hash table.

FIG. 7 is a block diagram of one embodiment of a dynamic notification queue 700 for the shared memory hash table. In FIG. 7, the notification queue 700 is a dual shared notification queue 700 for any number of readers, with writers being unaware of any reader state. The notification queue 700 includes a primary and secondary queue 702A-B. In one embodiment, a writer publishes slot changes to the primary notification queue 700. In one embodiment, each entry in the queue is a uint32_t slot-id plus a uint64_t sequence. The sequence is a virtual timer that increments each time the writer inserts something in the queue. On every slot identifiers insertion to the notification queue, the writer invalidates the old entries occupied by the same slot. This is part of the coalescing mechanism: old, prior entries are wiped out, while new recent entries are in the front. To locate a slot's position in the queue, a slot identifier to position table is maintained privately by the writer to provide direct lookup. In one embodiment, the notification queue 700 can fill up with invalidated entries and slot identifiers, at which time the writer initiates a compaction phase to sweep out the invalidated entries.

To notify sleeping readers that a new slot is available for consumption, the writer employs an out-of-band "reader-kick" mechanism. A single byte is sent over a Unix domain socket, giving the reader a hint that notification data is available.

In one embodiment, the notification queue 700 can grow and shrink as needed, depending on the running state of the network element. In this embodiment, if the notification queue 700 runs out of empty entries, the notification queue 700 can be increased. In this embodiment, the notification queue 700 is grown by growing the primary and secondary queues in-place. In one embodiment, the notification queue 700 can be increased in page-sized increments. Growing the notification queue is further described in FIG. 8B below.

In addition, the notification queue 700 can be shrunk if the number of active entries falls in the primary queue below a threshold (e.g., 25%), the primary and secondary queues 702A-B are shrunk. In one embodiment, each of the queues 702A-B is shrunk in-place. Shrinking the notification queue 700 is further described in FIG. 10 below.

In one embodiment, the notification queue can be compacted when the end of the queue is reached by removing the invalidated entries. In this embodiment, the secondary notification queue 702B of the same size as the primary notification queue 702A is maintained. The secondary notification queue 702B allows the writer to sweep the queue, copy over the active slot identifier entries, while readers continue to concurrently process entries. When the writer finishes compacting to the secondary queue 702B, the writer flips a master versioned pointer and the secondary queue 702B becomes the primary queue 702A. Readers that are concurrently looking at the notification queue 700 should validate that the master notification queue pointer has not changed before and after reading from the queue.

If a reader discovers that the notification queue is compacted while a slot/sequence was being read, the reader repositions itself. In one embodiment, the reader repositions itself by doing a binary search on the queue sequences to find the new position. The reader finds its position in the newly-compacted queue by searching for the first sequence that is larger than the sequence of the entry that it last processed. Once the new position is found, the reader can continue consuming slot notifications.

Similar to the other tables, the notification queue 700 is dynamically sized, which can grow and/or shrink depending on the state of the network element. In one embodiment, each of primary and secondary queues 702A-B can grow in-place by adding a segment to the end of the respective queue by remapping the queue. The notification queue further includes a numslots and a version. Similar to the numslots and version for the shared tables, the numslots and the version is the number of slots in the notification queue 700 and the version is a version of the notification queue 700. The notification queue 700 can also shrink as needed. Shrinking the notification queue is further described in FIG. 10 below. In one embodiment, the size of each notification slot is smaller than the entries for the shared table. With a notification queue 700 allocated in page size increments, the number of slots available for the notification queue 700 can be greater than the number of slots available in the shared table above. Thus, the notification queue does not need to be grown and/or shrunk on the same schedule as the tables in the shared table. In one embodiment, the notification queue 700 grows and/or shrinks as needed and not at the same time as the tables in the shared table.

Figure 8A:
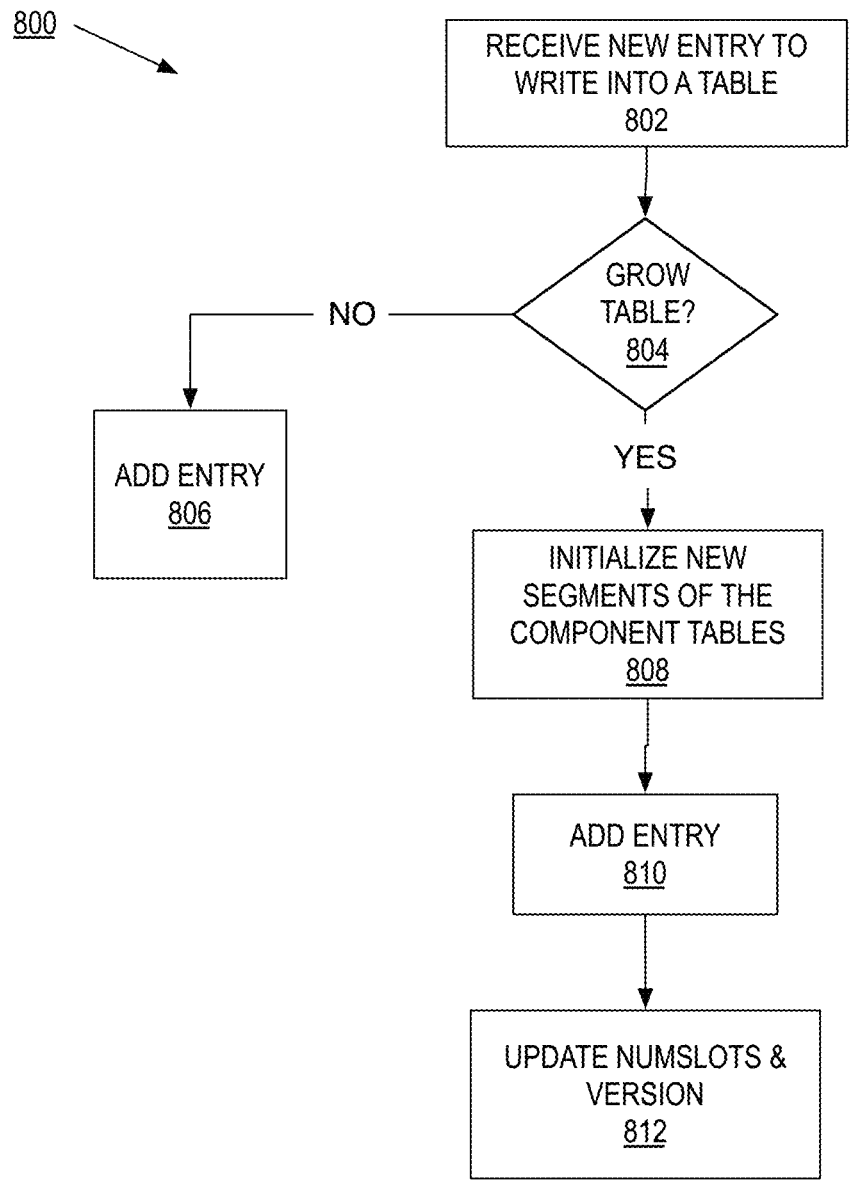
FIG. 8A is a flow diagram of one embodiment of a process to grow shared tables or a notification queue.

As described above, the shared tables can be grown in-place, depending on the running state of the network element. FIG. 8A is a flow diagram of one embodiment of a process 800 to grow the shared tables. In one embodiment, a writer performs process 800 to grow the shared tables, such as writer 108 as described in FIG. 1 above. In FIG. 8A, process 800 begins by receiving an entry to be stored in the shared tables at block 802. At block 804, process 800 determines if process 800 is to grow the table. In one embodiment, process grows the table if the table is full and without an available entry for a new slot or within a threshold of being full. If the table does not need to grow, at block 806, process 800 adds the entry. For example and in one embodiment, if the table is the shared tables, process 800 adds an entry to the bucket and slots table, so as to add an entry to the values table using a lock and wait free mechanism as described in U.S. patent application Ser. No. 14/270,226, entitled "System and Method of a Shared Memory Hash Table with Notifications", filed on May 5, 2014.

If the table does need to grow, process 800 initializes a new segment for the table growth. In one embodiment, process 800 determines size for the new segment. In this embodiment, the segment size can be a static increase (e.g., double existing size, add 50%, add one ore page size increments) or an adjustable increase (e.g., double existing size initially, and use smaller size as the size of the table gets closer to a maximum size). In one embodiment, the table growth is done in page size increments.

With this segment size, process 800 increases that size of the table by remapping each of the component tables. In one embodiment, if the shared tables grow by the segment size, process 800 grows each of the bucket and the slots tables based on the segment size. For example and in one embodiment, for shared tables growth, if each entry in the bucket and slots table is 64-bits and 128 bits, respectively, increasing the shared tables by one page of memory (4096 bytes) would increase the shared tables by approximately 170 new slots. In this example, the bucket table and slots table would be grown in a 1:2 ratio. Process 800 grows the bucket and slots tables by approximately 170 slots by remapping each of these tables. In one embodiment, each of the bucket and slots table is a memory mapped files and remapping is done via a system call.

In this embodiment, by remapping the table, each of the component tables appears as a contiguous range of memory to the writer and each of the readers with the same starting reference. Thus, neither the writer nor the reader needs to reset a reference to access the remapped table. At block 810, process 800 adds the entry to the shared tables or the notification queue. If the entry was a new value in the shared tables, process 800 allocates one of the bucket and slots entries and adds the value as described above with reference to FIGS. 3 and 4. Process 800 updates the numslots and version of the table at block 812. In one embodiment, process 800 updates these values atomically.

Figure 8B:
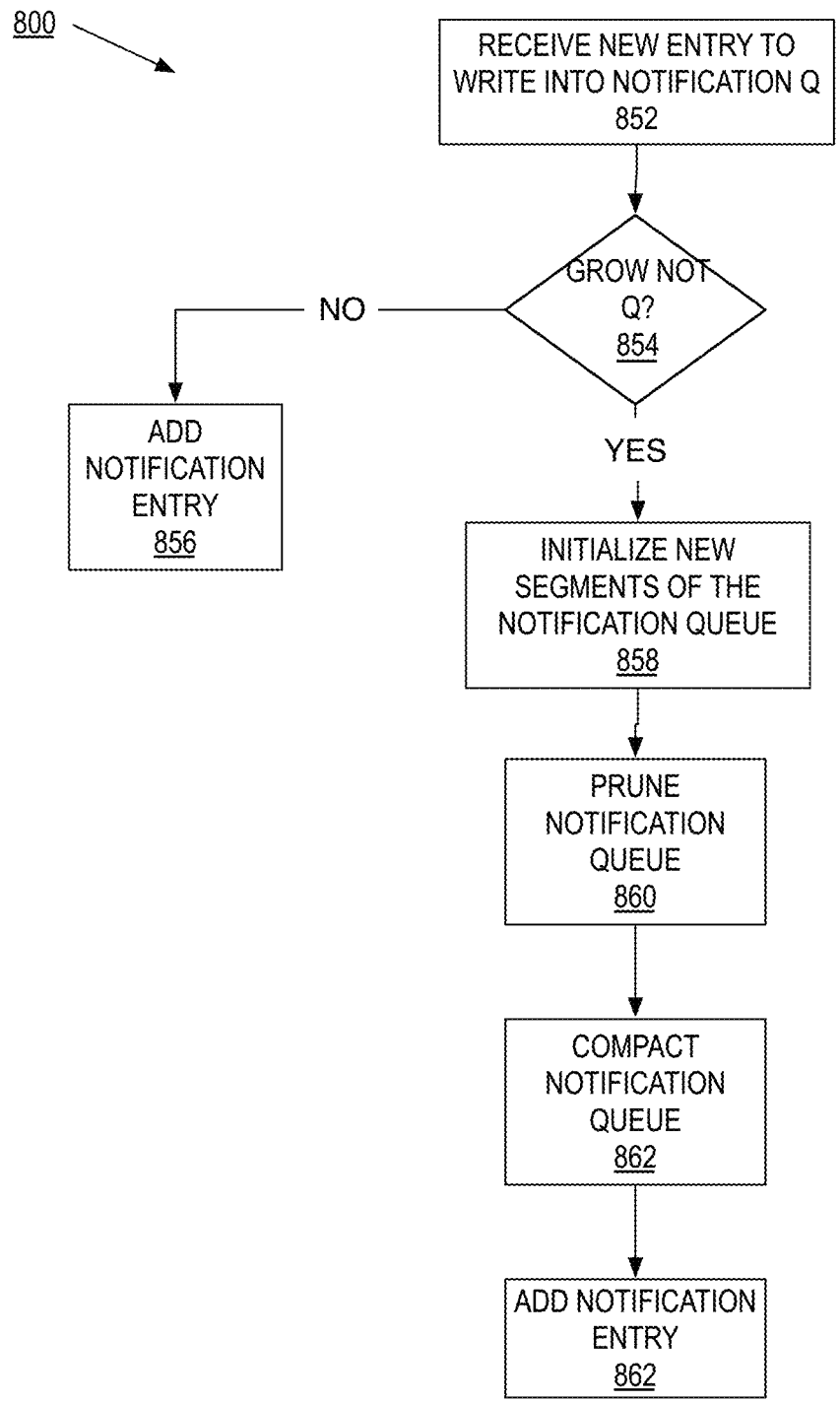
FIG. 8B is a flow diagram of one embodiment of a process to grow the notification queues.

In addition to growing the shared memory hash table, the notification queue can grow as needed as well. FIG. 8B is a flow diagram of one embodiment of a process 850 to grow the notification queues. In one embodiment, a writer performs process 850 to grow the shared tables, such as writer 108 as described in FIG. 1 above. In FIG. 8B, process 850 begins by receiving an entry to be stored in the notification queue at block 852. At block 854, process 850 determines if process 850 is to grow the notification queue. In one embodiment, process 850 grows the notification queue if the queue is full and without an available entry for a new entry or within a threshold of being full. If the notification queue does not need to grow, at block 856, process 850 adds the entry into the notification queue. In another example and embodiment, process 850 adds an entry in the notification queue as described in FIG. 7 above.

If the notification queue does need to grow, process 850 initializes a new segment for the notification queue growth at block 858. In one embodiment, process 850 determines size for the new segment. In this embodiment, the segment size can be a static increase (e.g., double existing size, add 50%, add one ore page size increments) or an adjustable increase (e.g., double existing size initially, and use larger or smaller sizes as the size of the table gets larger). In one embodiment, the notification queue growth is done in page size increments.

With this segment size, process 850 increases that size of the notification queue by remapping each of the notification queues (e.g., primary and secondary queues). In one embodiment, if the notification queue grows by the segment size, process 850 grows each of the primary and secondary queues based on the segment size. In one embodiment, each of the primary and secondary queues is a memory mapped file and remapping is done via a system call. In this embodiment, by remapping the notification queues, each of the queues appears as a contiguous range of memory to the writer and each of the readers with the same starting reference. Thus, neither the writer nor the reader needs to reset a reference to access the remapped queue.

At block 860, process 850 prunes the notification queue to remove the notification entries that have been read by the readers. In one embodiment, each of the readers maintains a position in the notification queue. This reader position is the last position in the notification queue that this reader has found no more notifications. In this embodiment, each of the readers further communicates this position to the writer. Since the writer knows each of the reader's last accessed position, the writer would know which of the notifications have been processed by all of the readers and which notifications have been processed by some or none of the readers. Thus, process 850 can prune the notification entries that have been processed by all of the readers. For example and in one embodiment, if the readers have positions 113, 150, and 200, process 850 can prune the notification entries 1-112. By pruning the notification entries that have been processed by all the readers, process 850 makes sure that no notification is pruned before a reader has a chance to access it.

Process 850 compacts the notification queue at block 860. In one embodiment, process 850 compacts the notification primary queue by reading each queue entry starting from the lowest reader position as described above and copies over the live entries to the secondary queue. In one embodiment, the compaction of the notification queue occurs without disruption of read access for a reader. In this embodiment, a reader can still have access to the notification entries while the compaction of the notification queue occurs. In addition, process 850 updates the number of slots and version information for the notification queue. Furthermore, process 850 switches the active pointer for the notification queues, making the secondary queue the primary and the primary queue the secondary. Process 850 adds the notification entry at block 862.

Figure 9A:
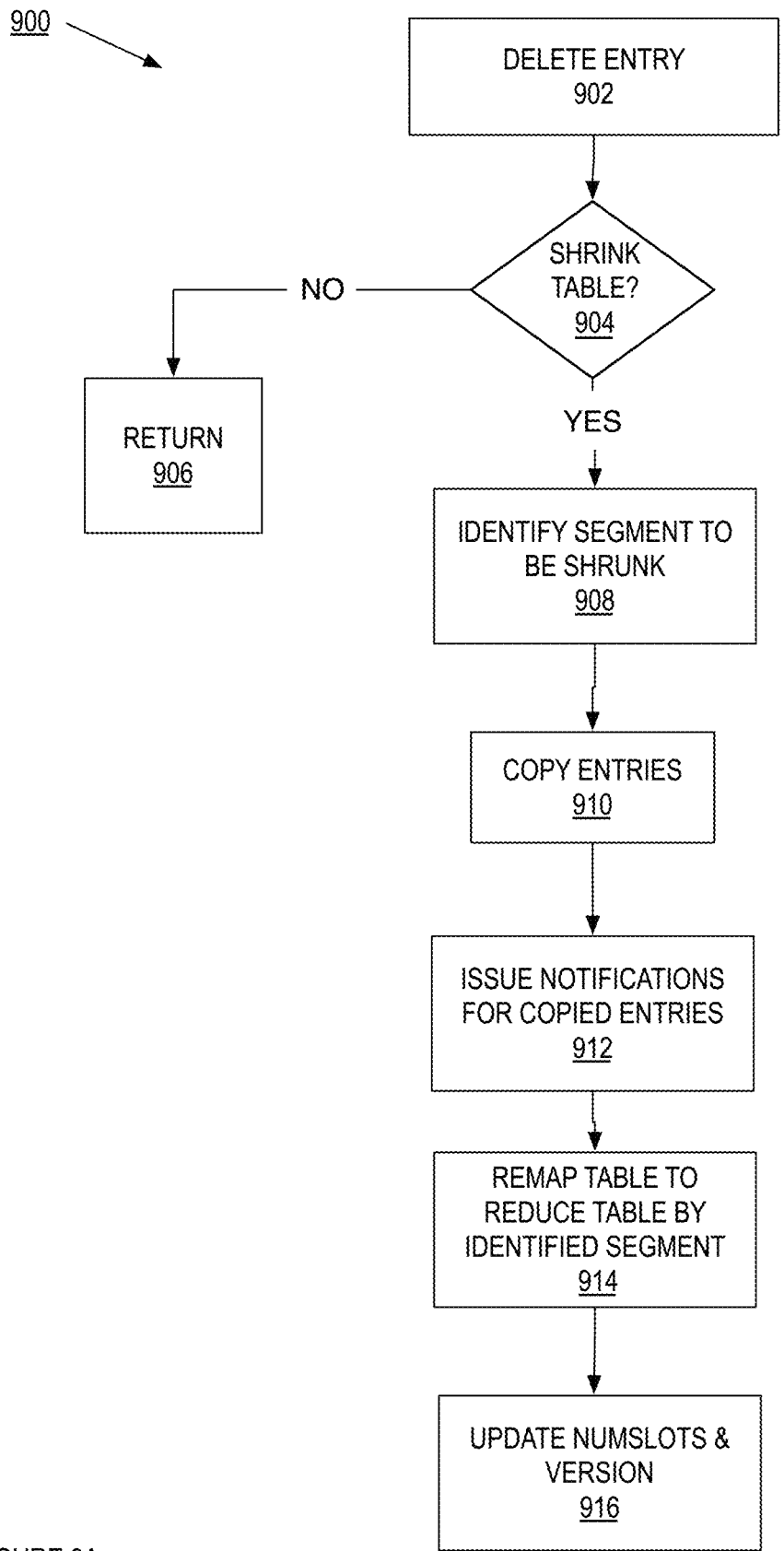
FIG. 9A is a flow diagram of one embodiment of a process to shrink shared tables.

In addition, to growing the shared memory hash table, the shared memory hash table can be shrunken. FIG. 9A is a flow diagram of one embodiment of a process 900 to shrink the shared tables. In one embodiment, a writer performs process 900 to shrink the shared tables, such as writer 108 as described in FIG. 1 above. In FIG. 9A, process 900 begins by deleting an entry in the table at block 902. In one embodiment, process 900 deletes an entry in the shared tables. For example and in one embodiment, process 900 deletes an entry as described in U.S. patent application Ser. No. 14/270,226, entitled "System and Method of a Shared Memory Hash Table with Notifications", filed on May 5, 2014. At block 904, process 900 determines if the table should be shrunk. In one embodiment, process 900 shrinks the shared table is the number of active entries is less than a threshold (e.g., the threshold is 25%). If the table is not to be shrunk, process 900 returns at block 906. If the table is to be shrunk, process 900 identifies a segment to be shrunk for each of the fixed sized tables at block 908. In one embodiment, the segment is a contiguous segment at the end of the table. For example and in one embodiment, In addition, process 900 determines to reduce the bucket and slots tables in half.

At block 910, process 900 copies active entries in the segment of the table that is to be deleted to empty slots an active segment of the table. In one embodiment, process 900 copies entries for a delete segment of the bucket and entries of the delete segment of the slots. For example and in one embodiment, if process 900 is to delete slot-ids 26-50 of the shared fixed sized table, and there are active entries in slot-ids 30 and 45, process 900 copies the bucket and slot entries for slot-ids 30 and 45 to a slot-id that is less than 26 in the bucket and slots table. Process 900 remaps the table to reduce the table size by the identified segment at block 916. In one embodiment, process 900 makes a systems call to remap the table. Process updates the numslots and version of table at block 916. In one embodiment, process 900 updates these values atomically. In this embodiment, process 900 increments the version of the table and updates the numslots value based on the new table size.

Figure 9B:
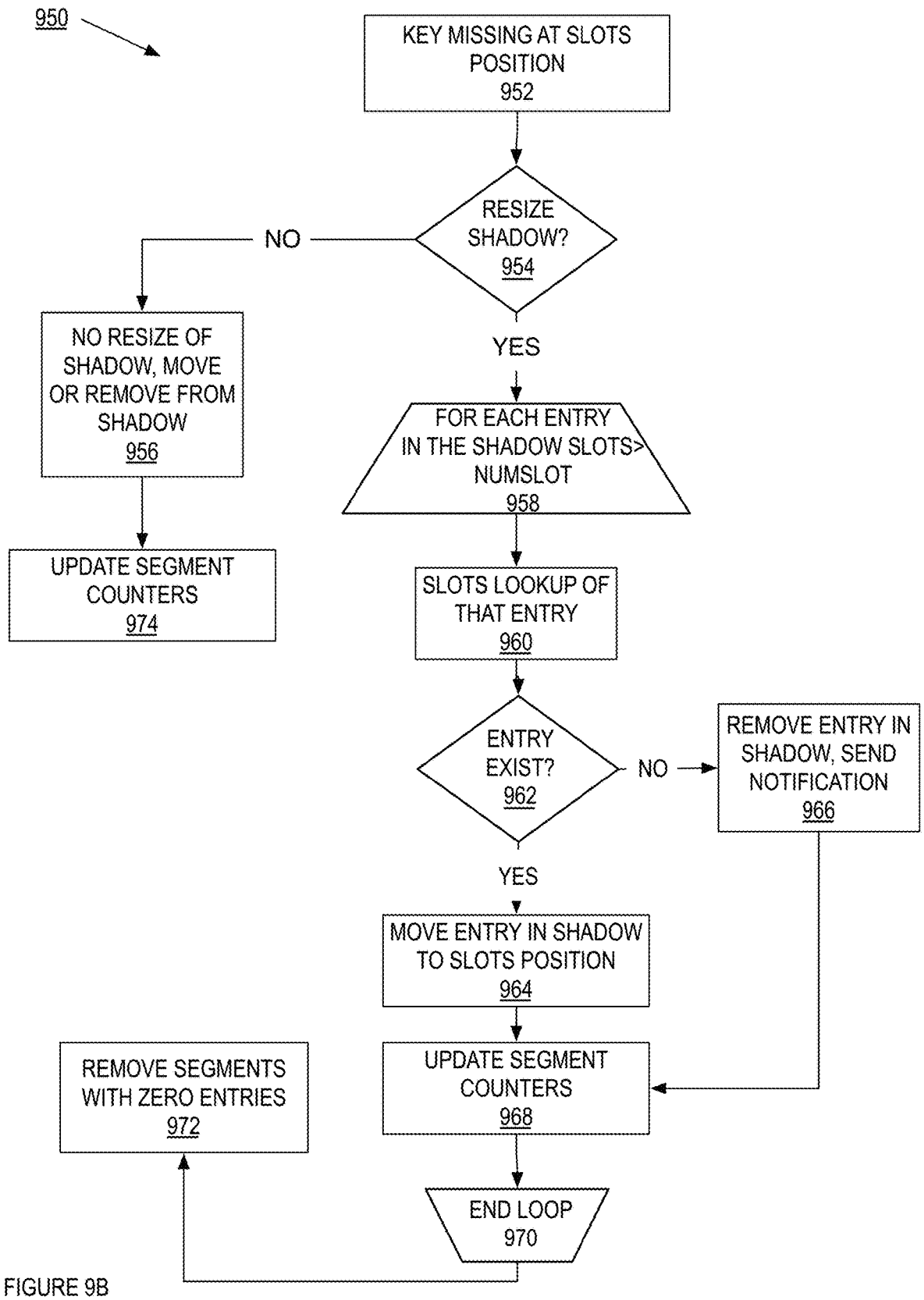
FIG. 9B is a flow diagram of one embodiment of a process to shrink local tables.

In addition to shrinking the shared memory hash tables, the local shadow table can be shrunk. In one embodiment, the local shadow is not shrunk until a reader determines that a key is missing from the shadow. FIG. 9B is a flow diagram of one embodiment of a process 950 to shrink local tables. In one embodiment, a reader performs process 950 to shrink the local tables, such as readers 112A-C as described in FIG. 1 above. In FIG. 9A, process 900 begins by determining that a key is missing from the shared tables. In one embodiment, the key can be missing because the shared memory hash table has shrunk and this key corresponds to a slot that is at a position larger than the number of slots the shared memory hash table currently holds. At block 954, process 950 determines if the number of slots in the shadow is greater than the number of slots in the shared memory hash table. If so, process 950 will resize the shadow. If there is no resizing the shadow, process 950 moves or removes the missing key from the shadow table at block 956. Execution proceeds to block 974, where process 950 updates the segment counters for the shadow. In one embodiment, segment counters are counters that are used to track the number of entries in the shadow table for each segment of the shadow table. In this embodiment, the shadow table includes one or more segments that are used to grow or shrink the shadow table. In one embodiment, the shadow table includes segments that are sized in increasing powers of two. For example under one embodiment, the shadow table could be sized with segments of one page, two pages, four pages, and so on. In this example, by using successively larger segment sizes, the amount of growing or shrinking can be reduced.

If the shadow table is to be resized, process 950 executes a processing loop (blocks 958-970) to move each entry in the shadow table that has a slot position that is greater than the number of slots in the shared memory hash table. At block 960, process 950 looks up the slot position for an entry in the shared memory hash table. In one embodiment, that entry may have been moved because the shared memory hash table shrunk or that entry may have been deleted. At block 962, process 950 determines that an entry exists in the slots table. In one embodiment, process 950 looks up the key for that entry in the slots table. If there is a result for that key, process 950 will receive the new slot position for that key. If there is no entry, then that key is likely deleted from the slots table. If there is no entry, at block 966, process 950 knows the key has been deleted from the slots table and proceeds to remove the entry from the shadow. In addition, process 950 sends a notification to the corresponding to process 950 that this key has been deleted. If an entry in the slots table does exist, process 950 moves the entry in the shadow to the new slots position. For example and in one embodiment, if the key K is moved from the slots position 110 to 25, process 950 moves the for key K from the slots position 110 in the shadow table to the new position of 25. Because this key possibly has been moved from one segment to another of the shadow table, process 950 updates the segment counters accordingly at block 968. For example and in one embodiment, process 950 decrements the segment counter for the segment corresponding to shadow position 110 and increments the segment counter corresponding to the shadow position 25. Process 950 ends the processing loop at block 970.

As a result of the entries being moved in the shadow table, some of the segments of the shadow table may have no entries. This is reflected in the segment counters for the segments of the shadow table. At block 972, process 950 removes the segments with zero entries. In one embodiment, this shrinks the size of the shadow table to have the same number of slots as the slot table. In one embodiment, the shadow is a memory mapped file, which can be remapped to a smaller size using a system call.

Figure 10:
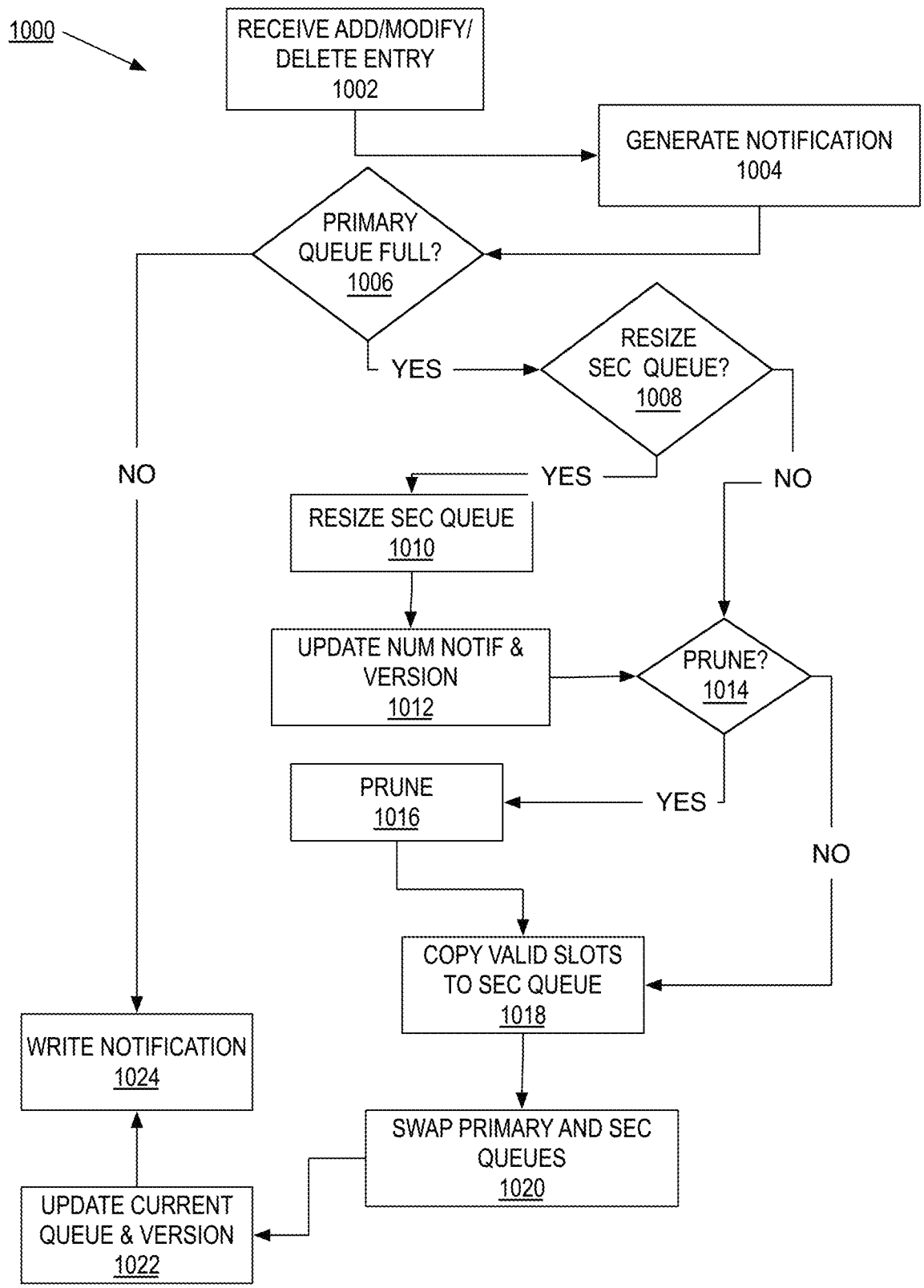
FIG. 10 is a flow diagram of one embodiment of a process to shrink (or grow) a notification queue.

FIG. 10 is a flow diagram of one embodiment of a process to shrink (or grow) a notification queue. Shrinking a notification queue is different than shrinking the fixed-sized tables, because shrinking a notification queue involved compacting the notification queue prior to shrinking the notification queue. In addition, there are no reader notifications used in shrinking the notification queue as used in shrinking the shared tables. In one embodiment, a writer performs process 1000 to shrink the notification queue, such as writer 108 as described in FIG. 1 above. In FIG. 10, process 1000 begins by receiving an entry, which can be an add, modify, or delete entry. At block 1004, process 1000 generates this notification for the notification queue. In one embodiment, process 1000 generates the notification as described in FIG. 8B, block 856 described above. Process 1000 determines if primary queue of the notification queue is full at block 1006. In one embodiment, if the primary queue is full, process 1000 determines if the notification queue can be pruned by removing invalidated notifications and/or process 1000 determines if the size of the notification queue should be resized. If the primary queue is not full, process 1000 writes the notification in the notification queue at block 1024.

If the primary queue is full, process 1000 determines if the secondary queue is to be resized at block 1008. In one embodiment, by counting the number of valid notifications in the primary queue. If the number of valid notifications in the primary queue is greater than an upper threshold (e.g. 50% of the size of the secondary queue) or smaller than a lower threshold (e.g. 25% of the size of the secondary queue), the queue will be resized. However, if the number of validations is between these two thresholds, the queue will not be resized. If the secondary queue is not to be resized, execution proceeds to block 1014 below. If the secondary queue is to be resized, process 1000 resizes the secondary queue by remapping the secondary to an increased size or a decreased size. In one embodiment, if process 1000 is to reduce the size of the secondary queue, process 1000 determines a segment size to reduce the secondary queue. For example and in one embodiment, the segment size can be reduced in a constant percentage or size (e.g., 50%, 25%, or another percentage; or particular size, such as in page increments). Alternatively, the segment size can be variable, depending on the current size of the secondary queue (e.g., reduce the secondary queue more when the secondary queue is larger and reduce the secondary queue less when the secondary queue is smaller). For example and in one embodiment, process 1000 can reduce the secondary queue such that the secondary queue has at least twice the number of valid notifications in the primary queue. Using the segment size, process 1000 remaps the secondary queue to be smaller. In one embodiment, the secondary queue is a memory mapped file, which can be remapped to a smaller size using a system call. In another embodiment, if process 1000 is to increase the size of the secondary queue, process 1000 can grow the secondary queue in-place by adding a segment to the end of this queue by remapping the queue. For example and in one embodiment, process 1000 increases the size as described in FIG. 7 above. Process 1000 updates the number of notifications and the version of the queue at block 1012. Execution proceeds to block 1014 below.

In one embodiment, the number of active notifications in the primary queue may indicate to process 1000 that the secondary queue is a candidate for pruning. At block 1014, process 1000 determines if the primary queue is to be pruned. In one embodiment, process 1000 prunes the notification queue pruning is decided based on the slowest reader, e.g., the lowest sequence number read among the sequence numbers received from readers. In this embodiment, pruning is skipping valid notifications for notifications that have been read by all of the readers. In one embodiment, process 1000 does not delete the notifications read by all of the readers because readers may be in the process of reading them. Instead, process 1000 does not copy these notifications over to the secondary when compacting, opting to update the internal count of valid notifications for the primary queue after pruning. This may also which might affect resizing decisions. If the table is not to be pruned, execution proceeds to block 1018 below. If the queue is to be pruned, process 1000 compacts the secondary queue. In one embodiment, process 1000 compacts the secondary queue by removing the invalidated entries as described in FIG. 7 above. In addition, process 1000 prunes the secondary queue by remapping the secondary queue to be smaller at block 1016.

At block 1018, process 1000 copies the valid notifications from the primary to the secondary queue. At block 1020, process 1000 makes the secondary queue the primary queue and the primary queue the secondary queue by swapping the primary and secondary queues. In one embodiment, by swapping the queues, the network element now uses the smaller queue for the notifications. Process 1000 updates the current queue number and version at block 1022. Process 1000 writes the notification at block 1024.

Figure 11A:
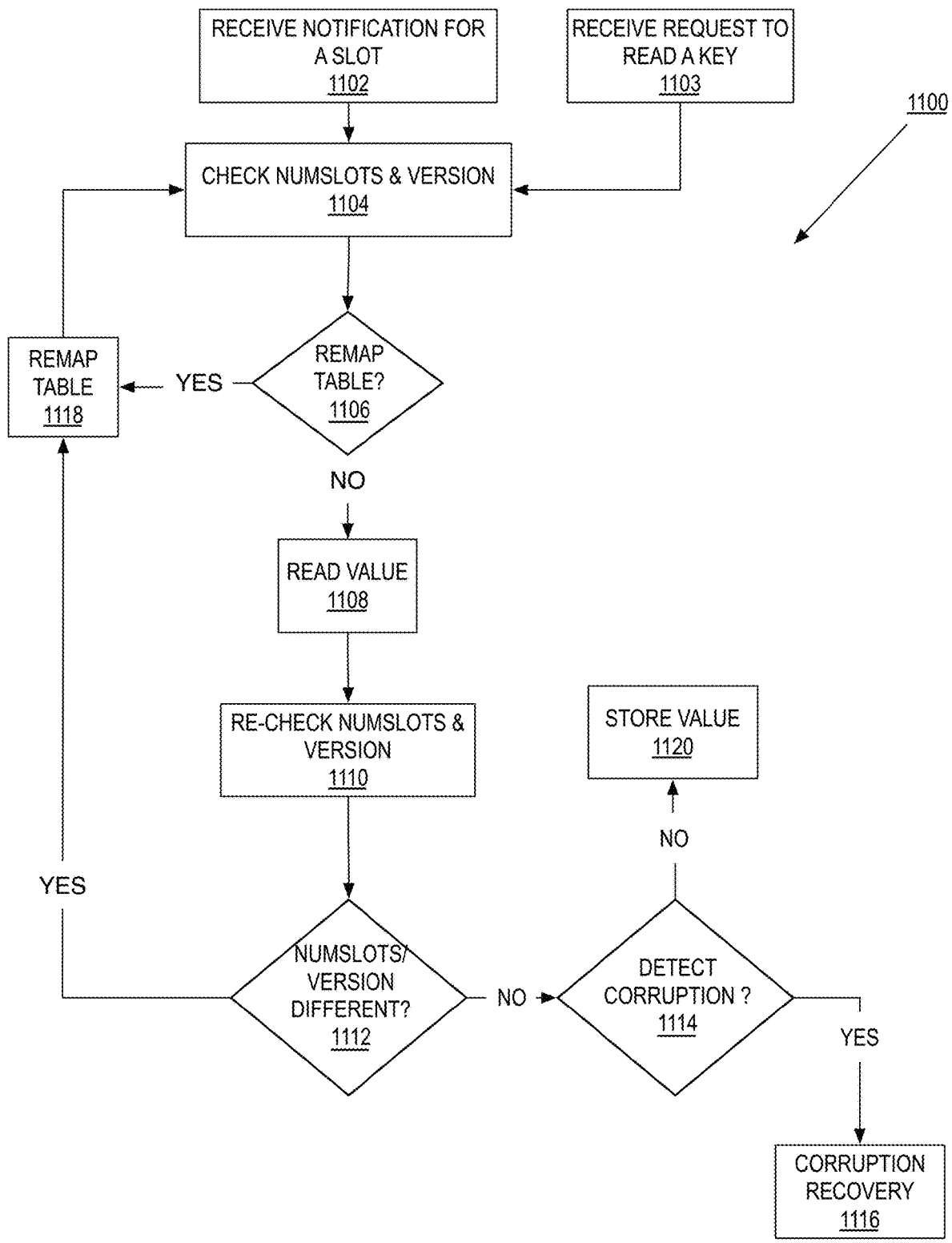
FIG. 11A is a flow diagram of one embodiment of a process to remap a table for a reader.

As the tables grow or shrink, the reader will periodically need to update its view of these tables. FIG. 11A is a flow diagram of one embodiment of a process 1100 to remap a table for a reader. In one embodiment, the table to remap is the local table the reader maintains. For example and in one embodiment, the local table is the local values 218, shadow 220, and shadow bucket 222 tables as described in FIG. 2 above. In this embodiment, if the shared memory changes in a way that needs to be reflected in the local reader table, process 1100 remaps the local table. In one embodiment, a reader performs process 1100 to remap a table for the reader, such as readers 112A-C as described in FIG. 1 above. In FIG. 11A, process 1100 begins by receiving a notification to read an entry at block 1102. In one embodiment, the notification entry is used to publish slot changes to the reader. Alternatively, process 1100 can begin by receiving a request to read a value for a key at block 1103. Process 1100 checks the numslots and/or version of the shared table so determine if these values have changed since the last time process 1100 accessed the shared table at block 1104. In one embodiment, the shared table may have grown since the last access by process 1100, may have shrunk, and/or a combination thereof. Each time the shared table grows or shrinks, the number of slots and the version of the shared table changes. In one embodiment, the number of slots may not have changed, but the version of the shared table changed. In this embodiment, the shared table may have grown and shrunk by the same amount since the last time process 1100 accessed the shared table.

In one embodiment, using the numslots and version number information, process 1100 determines if the table should be remapped. In one embodiment, process 1100 remaps the local table if the number of slots in the shared table is less than the number of slots in the local table, if the number of slots is the same and the version number is different, or if notification entry references a slot number that is greater than the number of slots in the local table. For example and in one embodiment, if the number of slots in the shared table is less than the number of slots in the local table, this means that the shared table has been shrunk and one or more of the entries in a delete segment of the shared table have been copied into different slots. In this embodiment, the reader will need to update the local reader table by remapping the local table.

In another embodiment, if the number of slots is equal, but the version has changed, this means that the shared table has shrunk at some point, with entries being copied from one slot to another. Similar to above, the reader will need to update the local reader table by remapping the local table. In a further embodiment, if process 1100 receives a notification for a slot number that is greater than the number of slots that the local table has, process 1100 does not have a corresponding slot for that value corresponding to the local table. In this embodiment, process 1100 will need to remap the local table so as to expand the local table so that the value can be stored in the slot indicated by the notification entry. For example and in one embodiment, if the notification entry is for 300 and the number of slots in the local table is 200, process 1100 remaps the local table so as to grow the local table to have the same number of slots as the shared table. Furthermore, in this embodiment, if the notification or read request that references a slot that is smaller than the number of slots known to the reader in the shadow (even thought the number of slots in the slots table is greater), then the shadow does not need to grow, as this slot is still accessible. This is an example of a "lazy" reader growth, where the reader grows the shadow table when the reader attempts to access a slot that is greater than the number of slot the reader knows about.

If the table needs to be remapped, process remaps the table at block 1106. In one embodiment, process 1100 remaps the tables by calling a system function to remap the table. In addition, process 1100 updates the table header, including the number of slots and the version. In one embodiment, process 1100 remaps the local table by determining the number of slots of the shared table and remapping the local table to have the same number of slots. In this embodiment, process 1100 remaps the local table by remapping the shadow table and shadow bucket tables, so as to grow or shrink these tables as needed. In one embodiment, these tables are remapped in pages size increments. In addition, process 1100 saves the version of the shared table for later version number comparisons. Execution proceeds to block 1104. In one embodiment, if the number of slots in the shared table is greater than the number of slots in the local table, but the notification entry indicates a slot that is less than or equal to the number of slots in the local table, process 1100 does not have to remap the local table. In this embodiment, since the slot in the notification entry is a slot process 1100 knows about, process 1100 can simply read the value from the slot indicated in the notification entry without having to remap the local table. This makes the maintaining of the local table more efficient as the local table does not always have to have the same size as the shared table. In this embodiment, process 1100 maintains the local table as needed. For example and in one embodiment, if the reader local table has 200 slots and process 1100 receives a notification for slot 150, process 1100 checks the numslots value of the dynamic shared memory hash table. In this example, process 1100 determines that the numslots is 300, which means that the shared memory hash table is larger than the reader local table. However, because the value of the notification (150) is less than the number of slots in the reader local table, the reader does not need to remap the local table so as to grow that table. In this example, process 1100 just reads the value corresponding to slot 150.

If the local table does not need to be remapped, at block 1108, process 1100 reads the value. In one embodiment, process 1100 reads the value from the local table using the slot value in the notification. In one embodiment, because the shared memory table could change during the read, process 1100 re-checks the numslots and version at block 1110. If the numslots and version have not changed, the read is successful, otherwise the value should re-read. At block 1112, process 1100 determines if the numslots and version have changed. If there is no change, execution proceeds to block 1114. If the numslots and version have changed, execution proceeds to block 1118 where process 1100 remaps the table at block 1118.

If there is no change in the numslots and version, process 1100 detects if there is corruption in the table at block 1114. In one embodiment, process 1100 detects corruption in the table. In this embodiment, corruption can be detected if a reader tries to read from a slot in shared memory that does not exist. In one embodiment, process 1100 knows the table is corrupted if on this out of bounds condition the table does not need to be resized. If there is no corruption (e.g., table not remapped or table remapped and no corruption detected), process 1100 stores the value in the slot indicated by the notification or read request at block 1120. If there is detected corruption, process 1100 preforms the corruption recovery at block 1116.

Figure 11B:
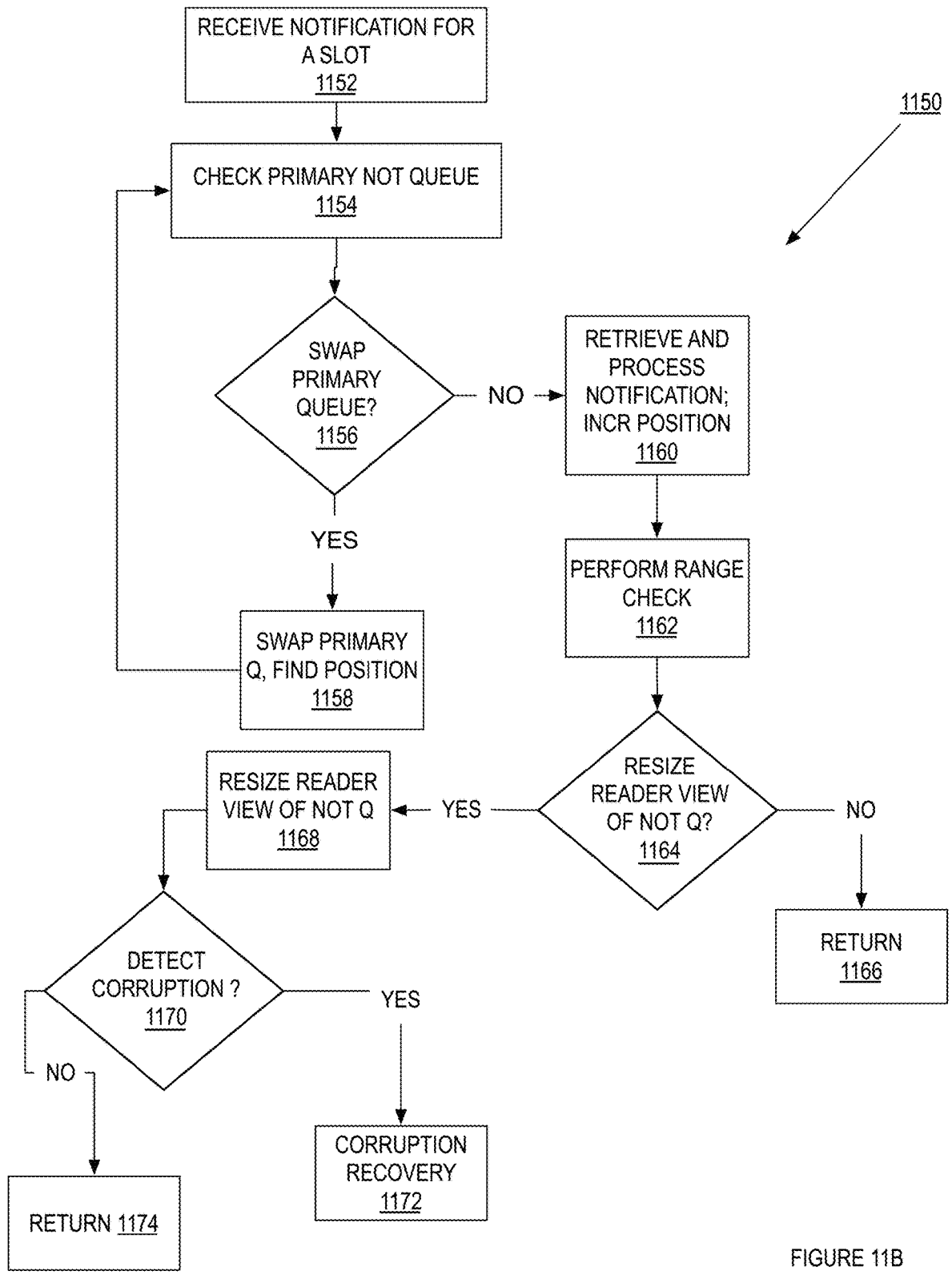
FIG. 11B is a flow diagram of one embodiment of a process to remap a notification queue for a reader.

FIG. 11B is a flow diagram of one embodiment of a process 1150 to remap a notification queue view for a reader. In one embodiment, a reader performs process 1150 to remap a notification queue view for the reader, such as readers 112A-C as described in FIG. 1 above. In FIG. 11B, process 1150 begins by receiving a notification entry for a slot at block 1152. In one embodiment, the notification entry is used to publish slot changes to the reader. At block 1154, process 1150 check if the primary notification queue should be swapped. In one embodiment, process 1150 checks the primary queue status by reading, atomically, a 32-bit number that gets incremented every time the table gets swapped, odd numbers mean secondary queue is active, even numbers is the primary. If the primary queue has been swapped, process 1150 swaps the primary notification queue pointer for the reader and finds the position for the reader in the new primary queue. Execution proceeds to block 1154 above.

If the primary queue does not needs to be swapped, process 1150 retrieves and processes the notification at block 1160. In addition, process 1150 increments the position for the reader. In one embodiment, the position is the last entry in the notification queue that the reader has read. At block 1162, process 1150 performs a range check on the position. In one embodiment, process 1150 compares the position with the total number of entries that are in the reader's view for the notification queue. For example and in one embodiment, if the position is one less than the number of total entries in the reader's view of the notification queue, process 1150 should attempt to resize the reader's view of the notification queue. At block 1164, process 1150 determines if the reader's view of the notification queue should be resized at block 1164. If not, process 1150 returns at block 1166.

If the reader's view of the notification queue is to be resized, process 1150 resizes this view at block 1168. In one embodiment, process 1150 determines the total number of entries in the notification queue and resizes the reader's view to be this size. In this embodiment, the notification queue is a memory mapped file and the remapping is done via a system call. At block 1170, process 1150 detects if there is corruption in the notification queue. In one embodiment, process 1150 detects corruption in the table. In one embodiment, there is a maximum slot identifier that can be notified stored in the header. For example, a reader validates that the slot-id pulled from the queue does not exceed that number. In one embodiment, process 1150 performs corruption detection after remapping the notification queue. If there is no corruption, process 1150 returns at block 1174.

In one embodiment, the reader will perform a retry on resize loop so that the reader can learn and adjust the mapping of notification table if the number of slots in the notification queue has shrunk. For example and in one embodiment, the reader will optimistically try running a function, such as reading a slot in the notification queue. If the function fails due to shared memory growth or shrinkage, the reader catches the exception, tries to resize the notification queue, and attempts to run the function again. As another example, below is pseudo-code below:

```
/**
 * Convenient function to perform an operation and
retry if the slot table
 * has shrunk.
 */
void retryOnResize( std::function< void( ) > func )
const {
    bool retry;
    do {
        try {
            retry = false;
            func( );
        } catch ( const CorruptionDetectedException
&e ) {
            if ( doResize( ) ) {
                retry = true;
                continue;
            }
            throw;
        }
    } while ( retry || doResize( ) );
}
```

In this example pseudo-code, when the retryOnResize( ) function is called, a function pointer is passed to a function invoked inside the retryOnResize( ) function. For example and in one embodiment, when the retryOnResize( ) function is invoked, the function passed in (e.g., reading a notification slot) is tried. If the function return cleanly, the retryOnResize( ) function returns without an error. If there is an exception (e.g., due to shared memory growth or shrinkage), the doResize( ) function is called to try and resize the reader notification queue. If the resize is successful, the variable retry is set to true and the function is called again. If the retry fails, the retryOnResize( ) function fails and throws an exception.

In general, a reader can start up anytime during the lifetime of the writer. During the startup, the reader starts up and copies all the slots from the shared memory table to the reader local table. For example and in one embodiment, the reader copies the slots from the shared memory table to the local shadow as illustrated in FIG. 2 above. In one embodiment, a problem can occur is a reader synchronizing, where the writer prunes the notification queue while the reader is starting up or getting the copy of the notification queue. If this happens, the copy of the local table the newly started reader has and the shared memory table maintained by the writer can be inconsistent. For example and in one embodiment, at initialization time, the reader attempts to establish a connection to the writer. The reader proceeds with retrieving the latest sequence number from the notification queue header in shared memory table, and copying the slots from the shared memory table into the local table of the reader. At that point, the reader is synchronized up to at least that sequence number, which is saved internally by the reader so as to let the reader know where to start consuming notifications in the notification queue. However, while the reader is copying slots, the writer may be pruning slots that the reader has not copied over. Thus, the reader will be actually more up to date than the tentative synchronization sequence number. If the attempt to establish a connection during initialization was unsuccessful, the reader waits until this reader receives a trigger from the writer, and then tries reconnecting.

When activities eventually run and there is an active connection, the writer handles that new reader connection and sends a first kick to the reader. Upon processing this first kick, the reader consumes the available notifications in the notification queue and sends the sequence number of the last consumed notification to the writer. The writer handles this data by kicking the reader again if the received sequence number is not equal to the latest sequence number.

In one embodiment, the sequence numbers that the writer collects from each reader can serve a dual purpose: (1) determine which readers need to be kicked to process new notifications and (2) determine the sequence number of the slowest connected reader.

In one embodiment, at any time, the writer may need to compact the notification queue by skipping invalidated when copying over to the other queue. In addition, the writer can optimize the compaction by looking at its collection of connected readers to find out what is the sequence of the slowest sequence. What about readers trying to initialize or connect? There are some windows of opportunity for the writer to put such readers in an inconsistent state, because the writer may be unaware of the readers at the moment the writer decides to prune notifications underneath the readers. These readers must be able to detect and recover from such events.

In one embodiment, the reader just needs to make sure that (1) the writer is aware of the sequence number of the reader and (2) the writer has not pruned any notification higher than that sequence number. Thus, when the writer receives the initial sequence number of a reader, the writer sends an acknowledgement kick. Upon receiving this acknowledgement kick, the reader checks what was the sequence number of the slowest connected reader at the time of last pruning. To that end, the writer updates a shared minimum sequence number in the primary notification queue header every time the writer prunes notifications. At any time, this number represents the shared minimum sequence number required to process the conquer queue. If the reader's sequence number is lower than the shared minimum sequence number, the reader resynchronizes the shared memory table.

In one embodiment, that at this point, the writer is aware of the reader position. Thus, a resynchronization may be needed at most once in a connection's lifetime. The resynchronization, similarly to the synchronization, copies all the slots from shared memory table into the local table except that it avoids notifying unchanged values in the case of a value shadow.

Figure 12A:
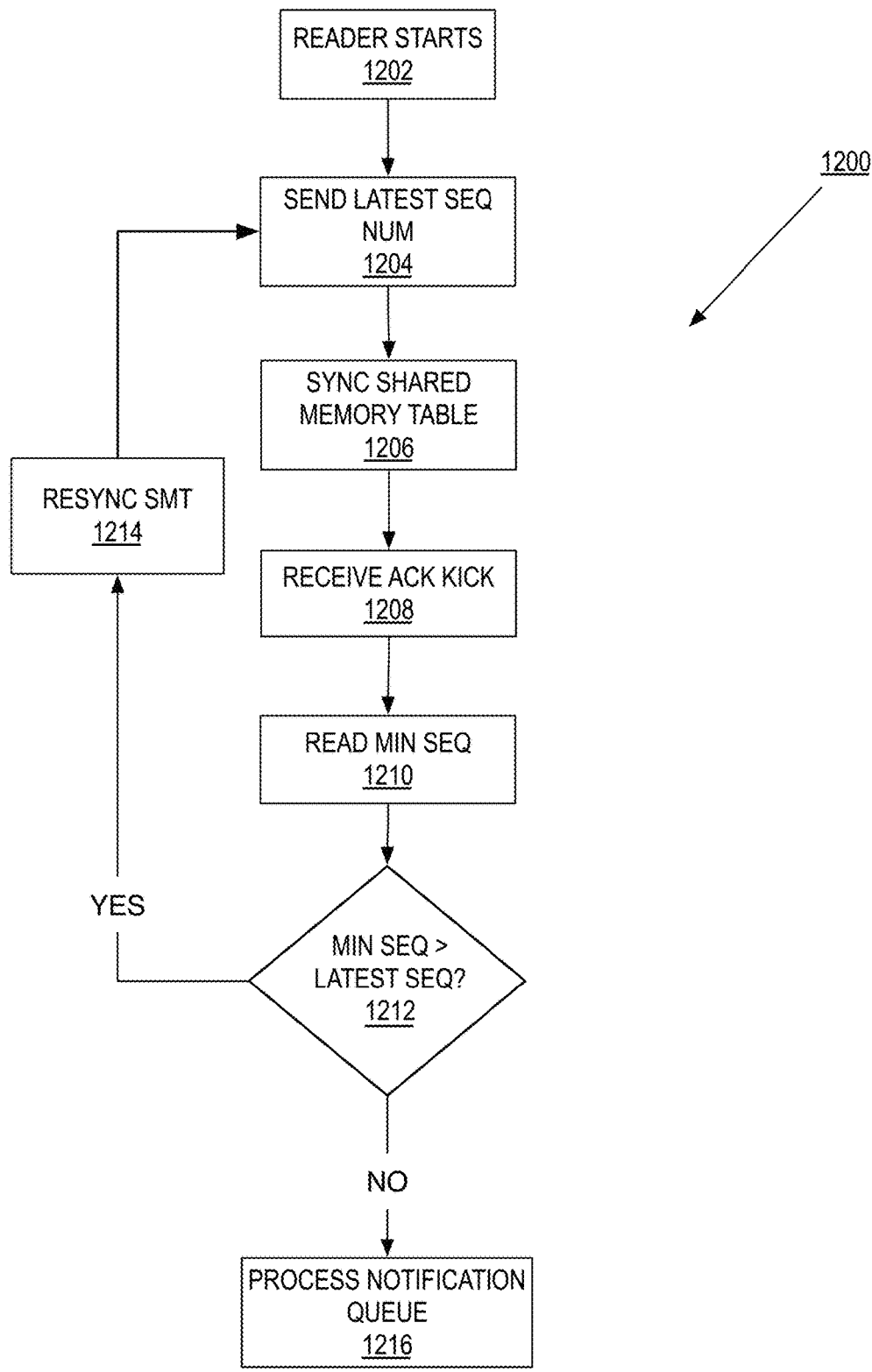
FIG. 12A is a flow diagram of an embodiment of a process to synchronize shared memory for a reader.

FIG. 12A is a flow diagram of an embodiment of a process 1200 to synchronize a shared memory table for a reader. In one embodiment, a reader performs process 1200 to synchronize a shared memory table, such as readers 112A-C as described in FIG. 1 above. In FIG. 12A, process 1200 begins by starting the reader at block 1202. In one embodiment, the reader establishes a connection to the writer. Process 1200 sends the last sequence number processed by the reader to the writer at block 1204. In this embodiment, the writer receives the last sequence number from this reader (and the other readers) and determines the lowest sequence number. This lowest sequence number is used by the writer to determine whether to prune the notification queue during a compaction. If there is a pruning, the writer will subsequently advertise the shared minimum sequence number to the readers. At block 1206, process 1200 synchronizes the reader local memory with the shared memory table maintained by the writer. In one embodiment, process 1200 synchronizes the local table by copying the all of the slots from the shared memory table into the local table of the reader. With the synchronized shared memory table, the reader can start to process the notifications stored in the notification queue. At block 1208, process 1200 receives an acknowledgement kick from the writer. Process 1200 reads the shared minimum sequence number at block 1210. Process 1200 determines if the shared minimum sequence number is greater than the last sequence number at block 1212. If the shared minimum sequence number is greater than the last sequence number, then the local table being processed by the reader is out of consistency with the shared memory table being maintained by the writer. In this case, the reader will need to resynchronize the reader local table with the shared memory table. If the shared minimum sequence number is greater than the last sequence number, process 1200 resynchronizes the reader copy of the local table at block 1214. In one embodiment, process 1200 resynchronizes the reader local table by copying the slots from the shared memory tables into the local table of the reader. By resynchronizing, the reader will have an updated local table that is likely to be consistent with the shared memory table maintained by the writer. Execution proceeds to block 1206 above, where process 1200 rechecks if the local table is consistent with the shared memory table. If the lowest sequence number is greater than or equal to last sequence number of the reader, process 1200 processes the notification queue at block 1216.

Figure 12B:
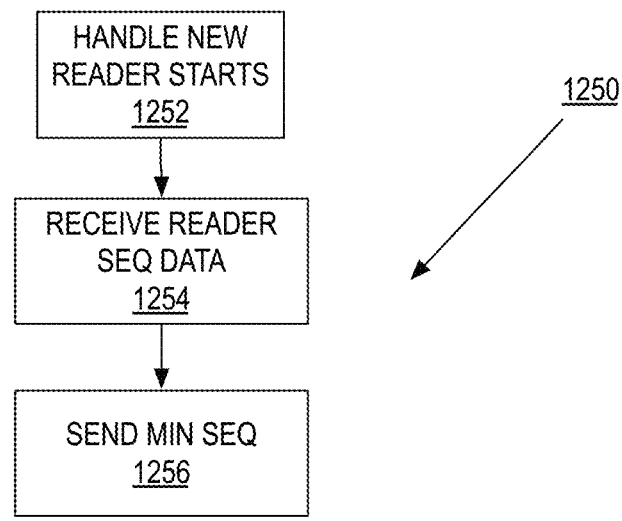
FIG. 12B is a flow diagram of an embodiment of a process to synchronize shared memory for a reader by a writer.

As per above, the reader communicates with the writer to determine if the local table maintained by the reader is consistent with the shared memory table of the writer. FIG. 12B is a flow diagram of an embodiment of a process 1250 to synchronize the shared memory table for a reader by a writer. In one embodiment, a writer performs process 1250 to synchronize the shared memory table, such as writer 108 as described in FIG. 1 above. In FIG. 12B, process 1250 begins by handling a new reader starting up at block 1252. In one embodiment, process 1250 registers this new reader as reader to be notified for new additions to the shared memory. At block 1254, process 1250 receives the reader sequence data. In one embodiment, the reader sequence data is the last sequence number that the reader has processed in the notification queue. Process 1250 determines the lowest sequence number at block 1256 and advertises this lowest sequence number to the reader. In one embodiment, the lowest sequence number is smallest sequence number that has been processed by the readers known to the writer. For example and in one embodiment, if the writer knows the reader 1 has a last sequence number of 26, reader 2 has a last sequence number of 32, and reader 3 has a last sequence number of 20, then the lowest sequence number is 20. In one embodiment, the writer uses the lowest sequence number to prune the notification queue.

Figure 13A:
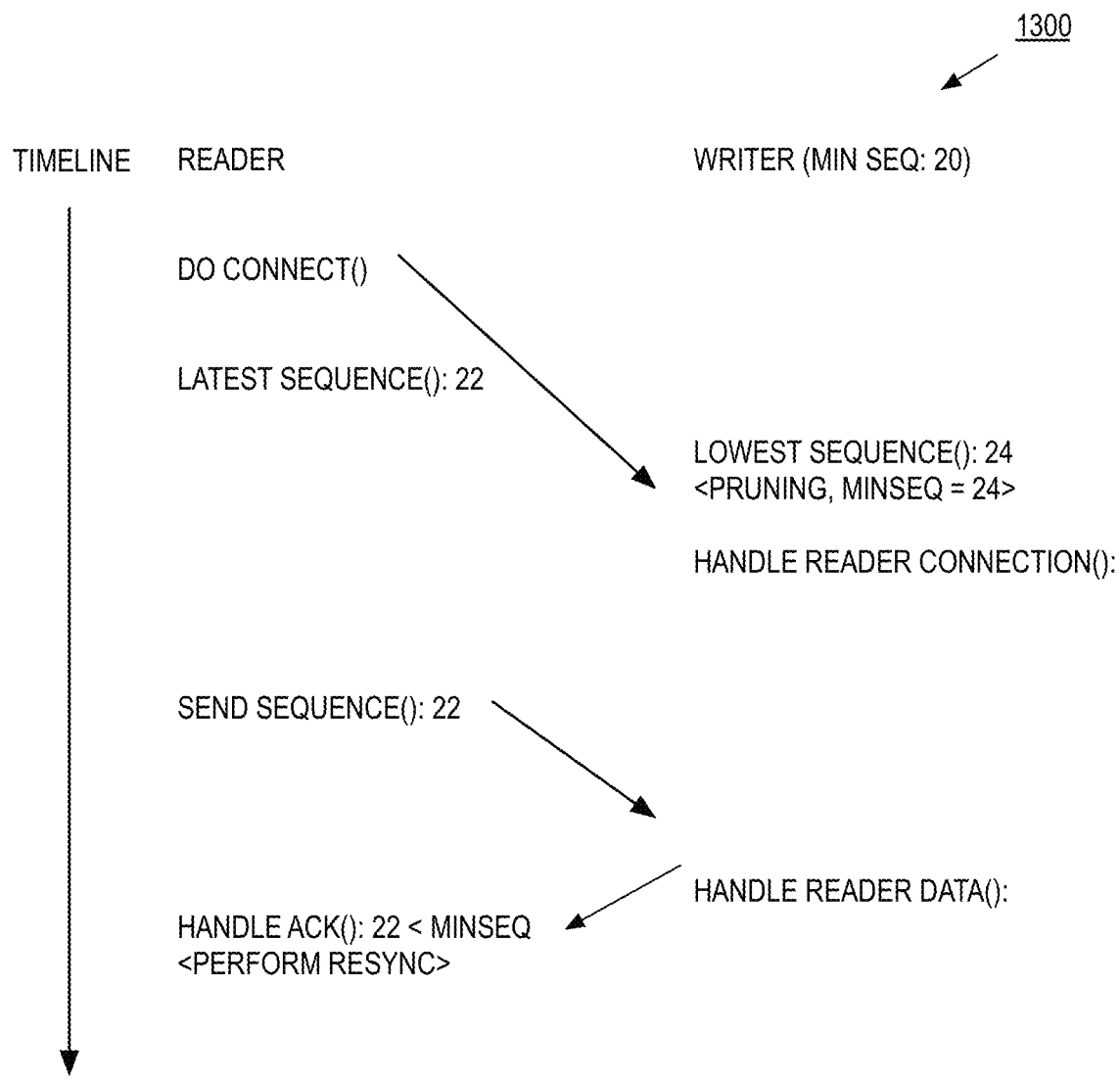
FIGS. 13A-C illustrate the behavior of the reader startup under various timing conditions.
Figure 13B:
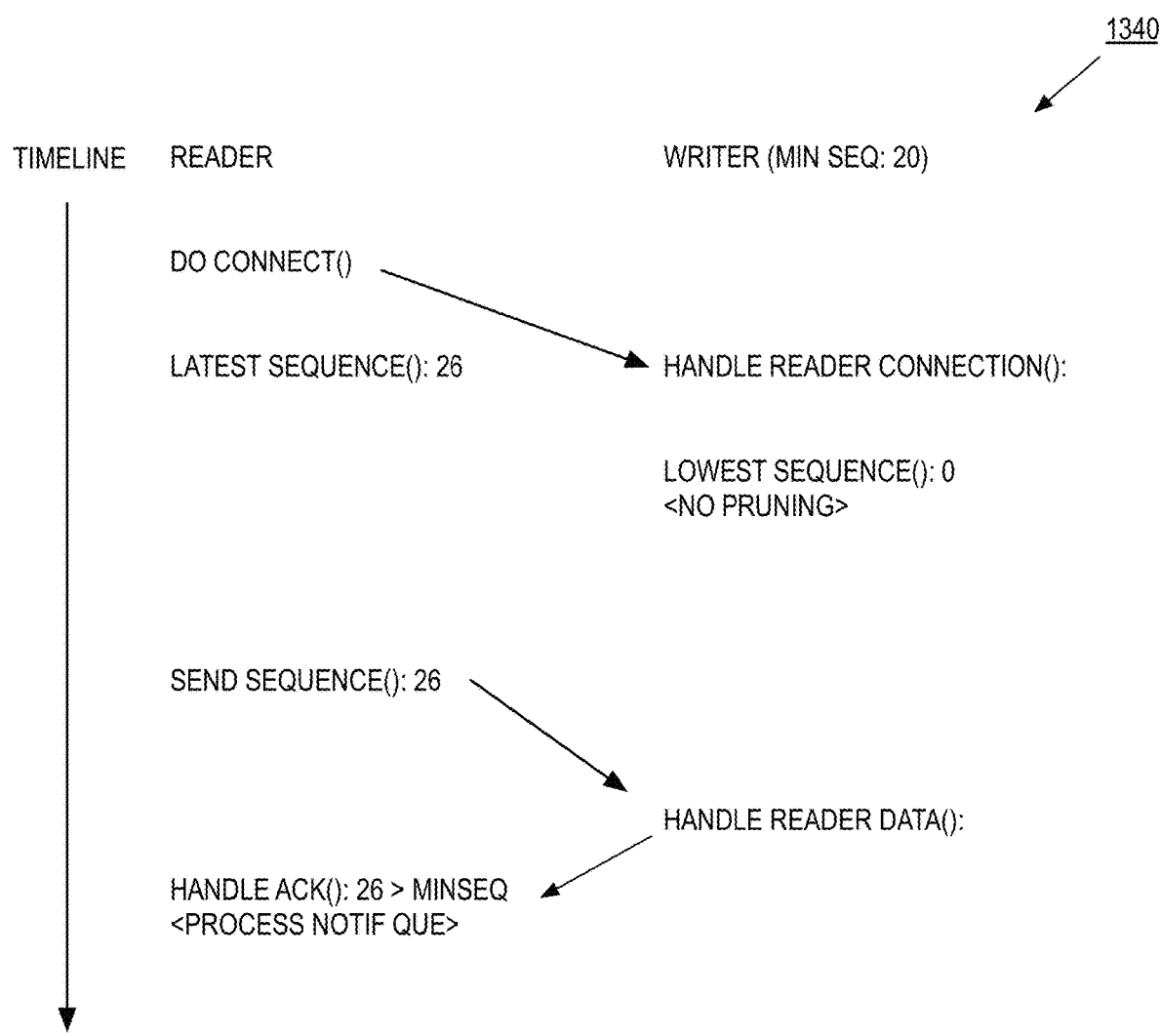
Figure 13C:
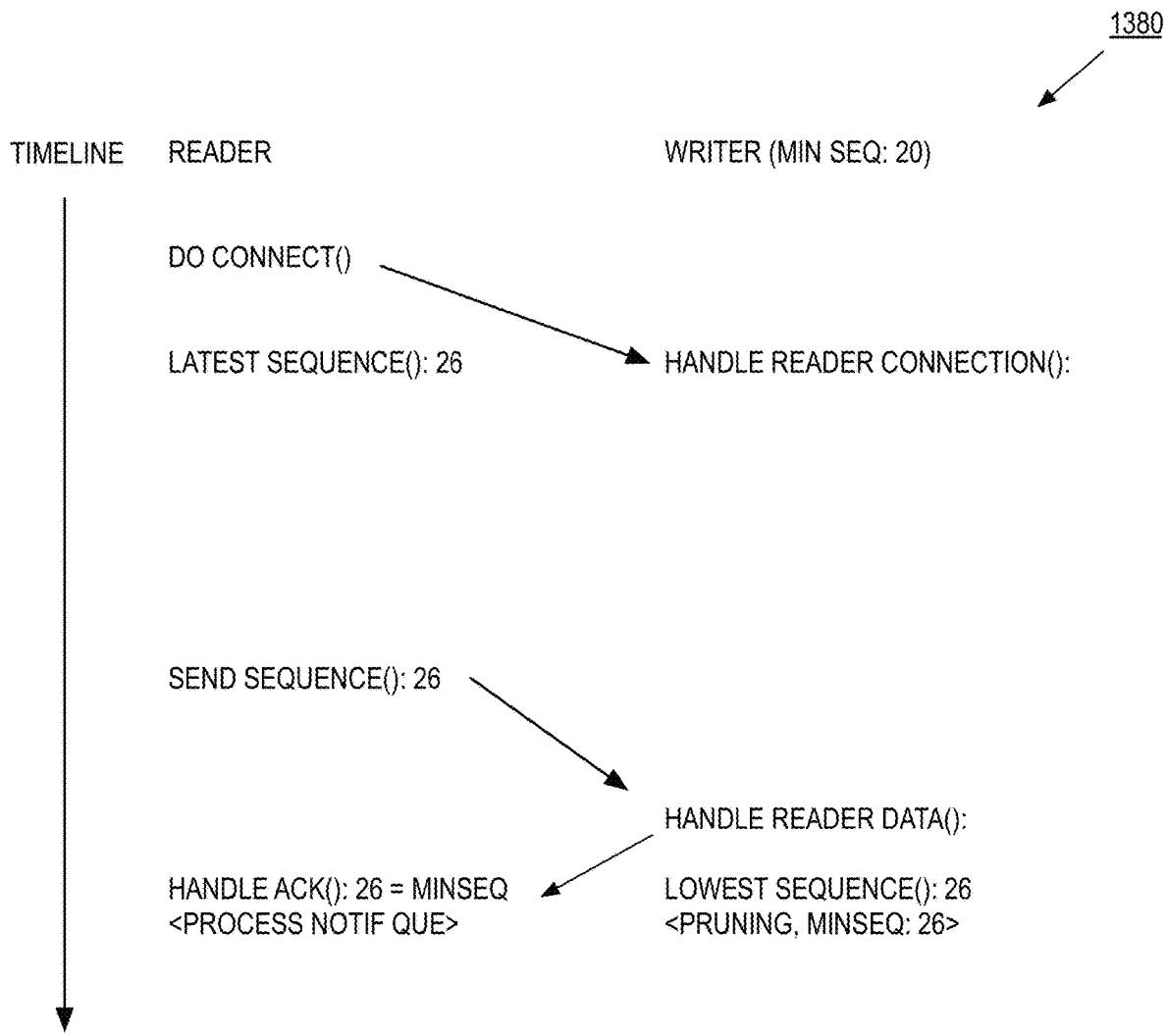

In one embodiment, when a reader starts up, the reader synchronizes the local table and checks to determine if the local table is consistent with the shared memory table. FIGS. 13A-C illustrate the behavior of the reader startup under various timing conditions. For example and in one embodiment, in FIG. 13A, the reader starts and connects with the writer. In this example, the writer has an initial minimum sequence of 20. In one embodiment, the lowest sequence number is maintained by the writer internally. In addition, the writer can update the shared minimum sequence number after a pruning of the notification in the notification queue, which represents the sequence number of notifications available in the notification queue. After attempting to connect with the writer, the reader has synchronized slots up to sequence number 22. Concurrently, the writer determines that the minimum sequence is 24 and prunes notification entries up to the sequence number. After pruning, the writer handles the reader connection. At this point, local table is not consistent with the shared memory table. The writer could decide to compact and compute the lowest sequence based on its current set of connected readers, before handling the connection of the new reader. As soon as the writer handles the reader's connection, the writer instantiates a reader client state machine which has a sequence of 0 initially. The reader sends the last sequence number to the writer, which, in this embodiment, is 22. The writer handles the reader's data and sends an acknowledgement. The reader receives this acknowledgement and reads the shared minimum sequence number is 24. The reader compares the shared minimum sequence number received from the writer with the last sequence of the reader. Since, in this example, the shared minimum sequence number is larger than the last sequence number, the local table of the reader is not consistent with the shared memory table maintained by the writer. In this case, the reader resynchronizes the local table with the shared memory table.

If the reader's last sequence number is greater than the shared minimum sequence number, the reader local table is consistent with the shared memory table and the reader can process the notification queue. In FIG. 13B, the reader connects with the writer as above. The writer handles the reader connections and determines that the lowest sequence number is 0. At this point, a notification queue compaction would compute a lowest sequence of 0 and postpone any pruning. The reader sends the last sequence number of the reader (in this case, sequence number of 26) and sends this sequence number. The writer receives this sequence number from the reader and determines the lowest sequence number (e.g., 20). The writer will advertise the shared minimum sequence number to the reader, where the reader will determine that the reader's last sequence number is greater than the shared minimum sequence number. In this case, the local table is consistent with the shared memory table and the reader proceeds with processing the notification queue.

Alternatively, if the reader's last sequence number equal to the shared minimum sequence number, the local table is consistent with the shared memory table and the reader can process the notification queue. In FIG. 13C, the reader connects with the writer as above. The writer handles the reader connections and determines that the lowest sequence number is 0 because the writer has not received the reader's sequence number. At this point, a notification queue compaction would compute a lowest sequence of 0 and postpone any pruning. The reader sends the last sequence number of the reader (in this case, sequence number of 26) and sends this sequence number. The writer receives this sequence number from the reader and determines the lowest sequence number (e.g., 26). The writer will advertise the shared minimum sequence number to the reader, where the reader will determine that the reader's last sequence number is greater than the shared minimum sequence number. In this case, the local table is consistent with the shared memory table and the reader proceeds with processing the notification queue.

While in one embodiment, the reader synchronization mechanism above is described in reference to the shared memory hash table as illustrated in FIG. 2. In alternate embodiments, this reader synchronization mechanism can be applied to another type of shared data structure where notifications are used to signal changes made by one or more writers to the data structure for different readers that wish read up to date values in the data structure. For example and in one embodiment, this reader synchronization mechanism can be applied to different types of data structures such as dictionaries, linked lists, trees, vector, and/or other types of data structures.

Figure 14:
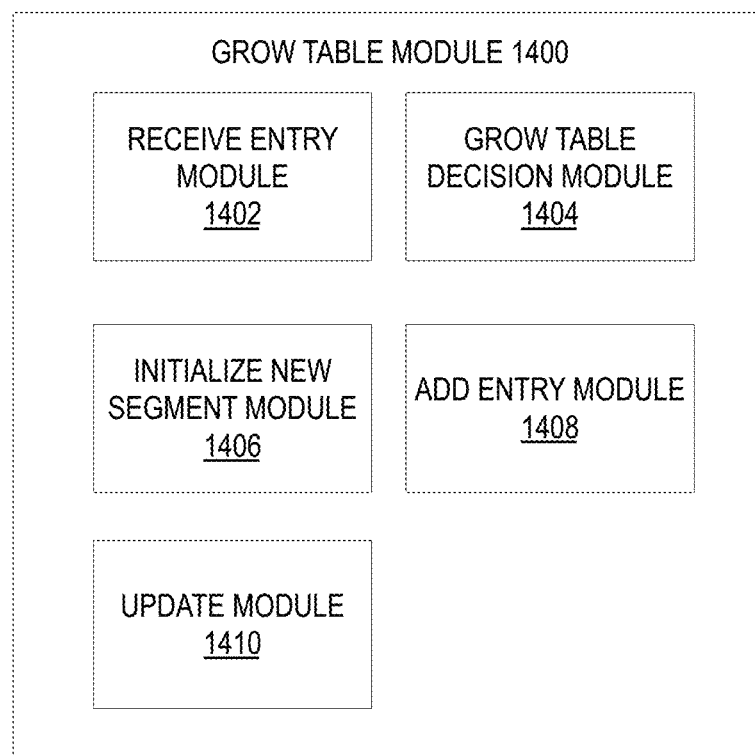
FIG. 14 is a block diagram of one embodiment of a grow table module that grows shared tables or a notification queue.

FIG. 14 is a block diagram of one embodiment of a grow table module 1400 that grows shared tables or a notification queue. In one embodiment, the grow table module 1400 is part of the writer, such as the writer 108 as described in FIG. 1 above. In one embodiment, the grow table module 1400 includes a receive entry module 1402, a grow table decision module 1404, an initialize new segment module 1406, an add entry module 1408, and an update module 1410. In one embodiment, the receive entry module 1402 receive an entry to be stored in the shared table as described in FIG. 8, block 802 above. The grow table decision module 1404 determines whether to grow the table as described in FIG. 8, block 804 above. The initialize new segment module 1406 initializes a new segment for the table as described in FIG. 8, block 808 above. The an add entry module 1408 adds an entry to the table as described in FIG. 8, blocks 806 and 810 above. The update module 1410 updates the table characteristics as described in FIG. 8, block 812 above.

Figure 15:
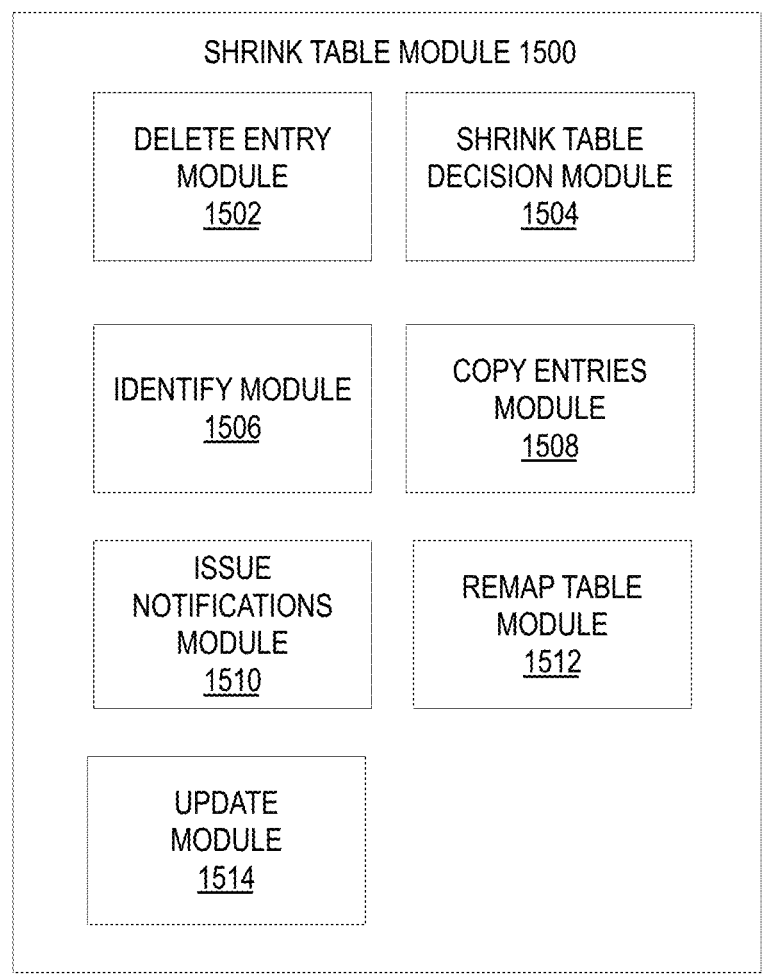
FIG. 15 is a block diagram of one embodiment of a shrink table module 1500 that shrinks shared tables.

FIG. 15 is a block diagram of one embodiment of a shrink table module 1500 that shrinks shared tables. In one embodiment, the shrink table module 1500 is part of the writer, such as the writer 108 as described in FIG. 1 above. In one embodiment, the shrink table module 1500 includes a delete entry module 1502, shrink table decision module 1504, identify module 1506, copy entries module 1508, issue notifications module 1510, remap table module 1512, and update module 1514. In one embodiment, the delete entry module 1502 deletes an entry as described in FIG. 9, block 902 above. The shrink table decision module 1504 determines whether to shrink the table as described as described in FIG. 9, block 904 above. The identify module 1506 identifies a segment to be shrunk as described in FIG. 9, block 908 above. The copy entries module 1508 copies entries as described in FIG. 9, block 910 above. The issue notifications module 1510 issue notifications as described in FIG. 9, block 912 above. The remap table module 1512 remaps the table as described in FIG. 9, block 914 above. The update module 1514 updates the table as described in FIG. 9, block 916 above.

Figure 16:
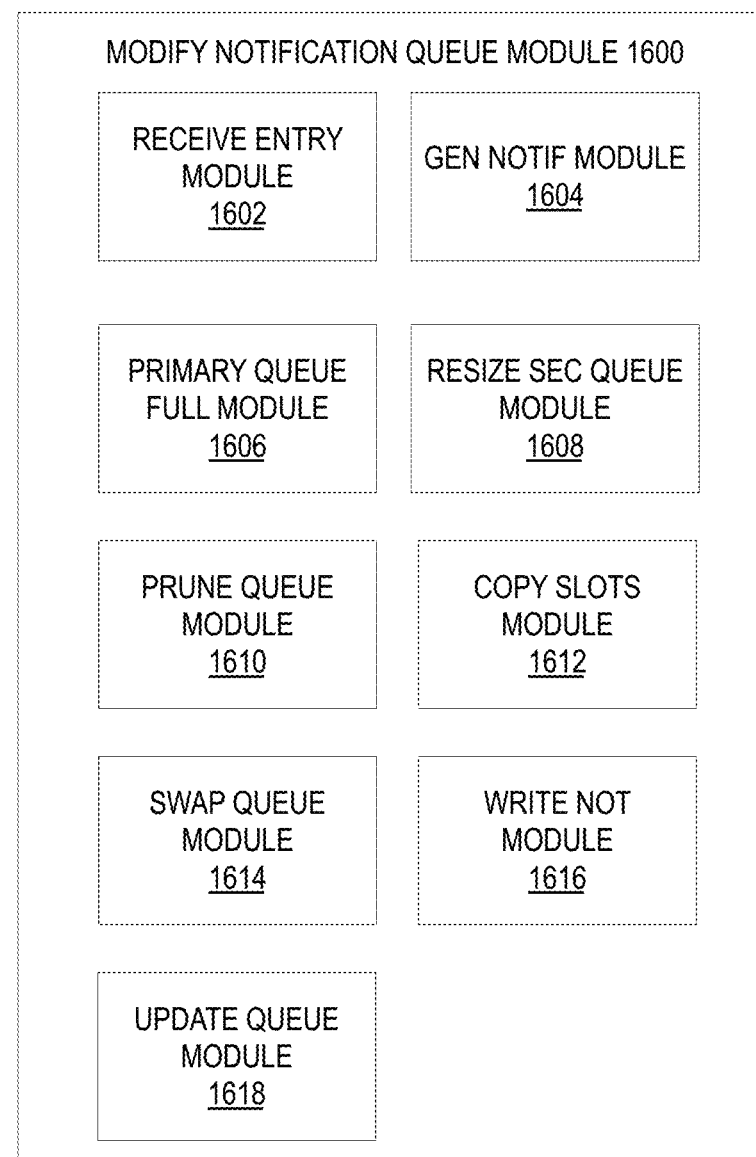
FIG. 16 is a block diagram of one embodiment of a shrink notification queue module 1600 to shrink a notification queue.

FIG. 16 is a block diagram of one embodiment of a shrink notification queue module 1600 to shrink a notification queue. In one embodiment, the shrink notification queue module 1600 is part of the writer, such as the writer 108 as described in FIG. 1 above. In one embodiment, the shrink notification queue module 1600 includes a receive entry module 1602, generate notification module 1604, primary queue full module 1606, resize secondary queue module 1608, prune queue module 1610, copy slots module 1612, swap queue module 1614, write notification module 1616, and update queue 1618. In one embodiment, the receive entry module 1602 receives the entry as described in FIG. 10, block 1002 above. The generate notification module 1604 generates the notification as described in FIG. 10, block 1004 above. The primary queue full module 1606 determines if the primary queue is full as described in FIG. 10, block 1006 above. The resize secondary queue module 1608 resizes the secondary queue as described in FIG. 10, block 1010 above. The prune queue module 1610 prunes the primary queue as described in FIG. 10, block 1016 above. The copy slots module 1612 copies the slots as described in FIG. 10, block 1018 above. The swap queue module 1614 swaps the queue as described in FIG. 10, block 1020 above. The write notification module 1616 writes the notification as described in FIG. 10, block 1024 above. The update queue 1618 updates the queue as described in FIG. 10, block 1022 above.

Figure 17:
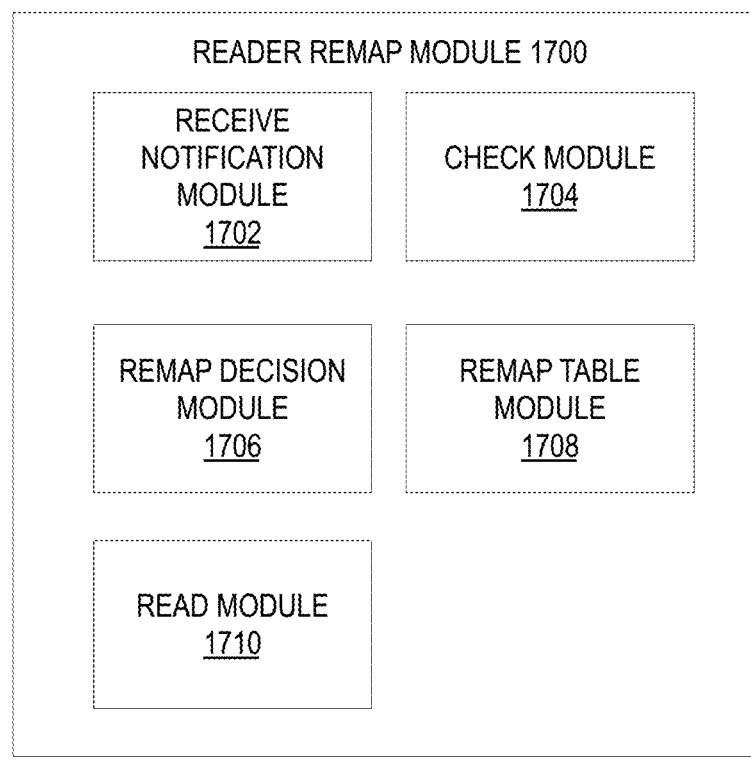
FIG. 17 is a block diagram of one embodiment of a reader remap module 1700 to remap a table for a reader.

FIG. 17 is a block diagram of one embodiment of a reader remap module 1700 to remap a table for a reader. In one embodiment, the reader remap module 1700 is part of the reader, such as the reader(s) 112A-C as described in FIG. 1 above. In one embodiment, the reader remap module 1700 includes a receive notification module 1702, check module 1704, remap decision module 1706, remap table module 1708, read module 1710, numslot/version difference module 1712, corruption detection module 1714, and store value module 1716. In one embodiment, the receive notification module 1702 receives a notification as described in FIG. 11, block 1102 above. The check module 1704 checks the number of slots and version as described in FIG. 11, blocks 1104 and 1110 above. The remap decision module 1706 determines if the table should be remapped as described in FIG. 11, block 1106 above. The remap table module 1708 remaps the table as described in FIG. 11, block 1118 above. The read module 1710 reads the value as described in FIG. 11, block 1108 above. The numslot/version difference module 1712 determines if the numslot/version is different as described in FIG. 11, block 1112 above. The corruption detection module detects if there is corruption as described in FIG. 11, block 1114 above. The store value module stores the value as described in FIG. 11, block 1120 above.

Figure 18:
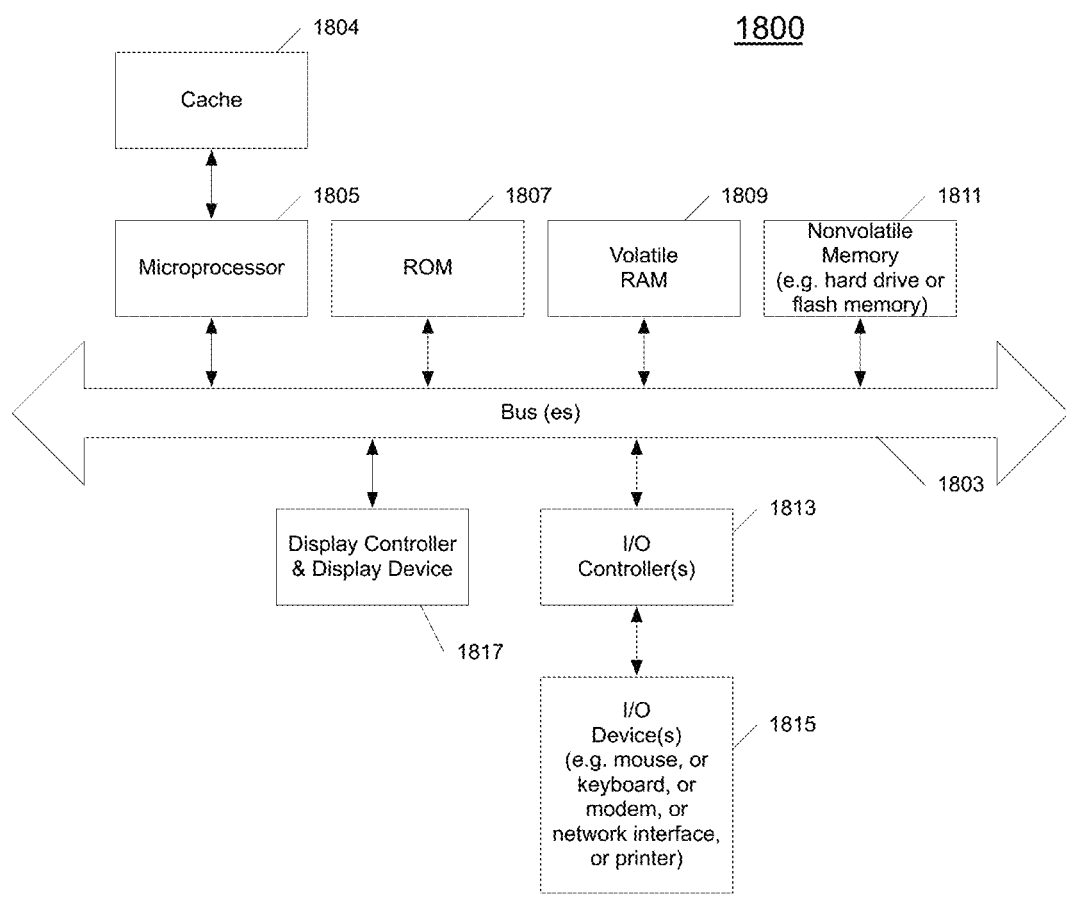
FIG. 18 illustrates one example of a typical computer system, which may be used in conjunction with the embodiments described herein.

FIG. 18 shows one example of a data processing system 1800, which may be used with one embodiment of the present invention. For example, the system 1800 may be implemented including a network element 100 as shown in FIG. 1. Note that while FIG. 18 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

As shown in FIG. 18, the computer system 1800, which is a form of a data processing system, includes a bus 1803 which is coupled to a microprocessor(s) 1805 and a ROM (Read Only Memory) 1809 and volatile RAM 1809 and a non-volatile memory 1811. The microprocessor 1805 may retrieve the instructions from the memories 1807, 1809, 1811 and execute the instructions to perform operations described above. The bus 1803 interconnects these various components together and also interconnects these components 1805, 1807, 1809, and 1811 to a display controller and display device 1815 and to peripheral devices such as input/output (I/O) devices which may be mice, keyboards, modems, network interfaces, printers and other devices which are well known in the art. In one embodiment, the system 1800 includes a plurality of network interfaces of the same or different type (e.g., Ethernet copper interface, Ethernet fiber interfaces, wireless, and/or other types of network interfaces). In this embodiment, the system 1800 can include a forwarding engine to forward network date received on one interface out another interface.

Typically, the input/output devices 1815 are coupled to the system through input/output controllers 1819. The volatile RAM (Random Access Memory) 1809 is typically implemented as dynamic RAM (DRAM), which requires power continually in order to refresh or maintain the data in the memory.

The mass storage 1811 is typically a magnetic hard drive or a magnetic optical drive or an optical drive or a DVD RAM or a flash memory or other types of memory systems, which maintain data (e.g. large amounts of data) even after power is removed from the system. Typically, the mass storage 1811 will also be a random access memory although this is not required. While FIG. 18 shows that the mass storage 1811 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 1803 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "process virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

Figure 19:
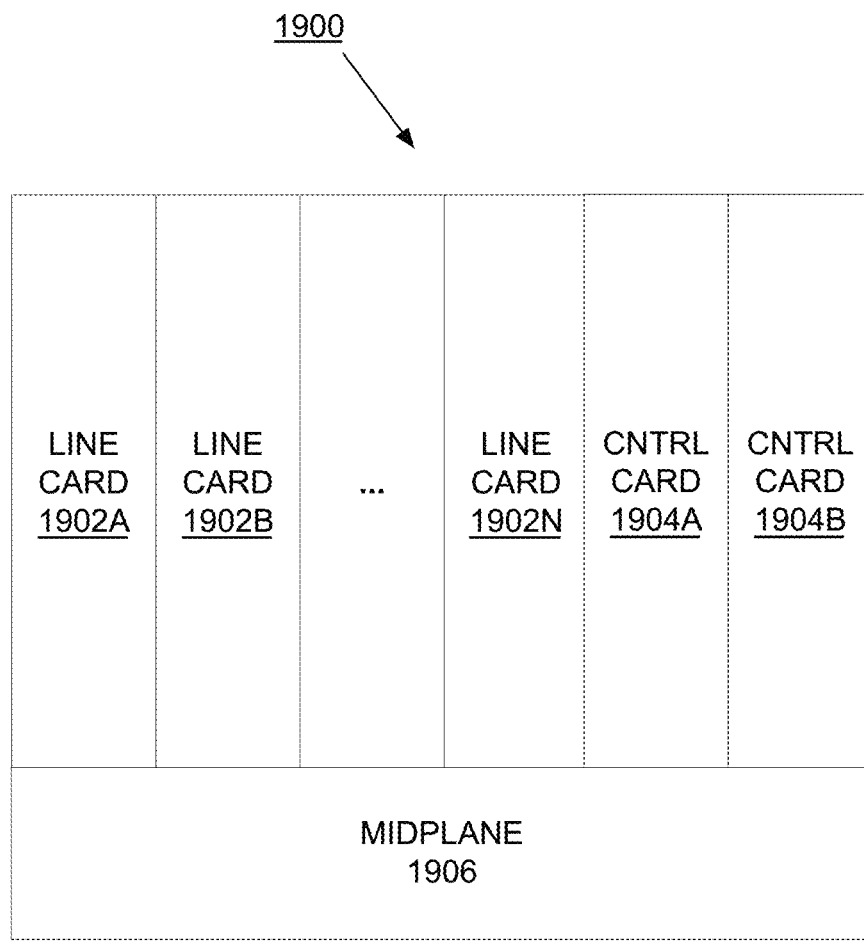
FIG. 19 is a block diagram of one embodiment of an exemplary network element that includes a shared memory hash table with notifications to readers for updates.

FIG. 19 is a block diagram of one embodiment of an exemplary network element 1900 that reads and writes data with a dynamic shared memory hash table using notifications. In FIG. 19, the midplane 1906 couples to the line cards 1902A-N and controller cards 1904A-B. While in one embodiment, the controller cards 1904A-B control the processing of the traffic by the line cards 1902A-N, in alternate embodiments, the controller cards 1904A-B, perform the same and/or different functions (e.g., writing data with a dynamic shared memory hash table using reader notifications, etc.). In one embodiment, the line cards 1902A-N process and forward traffic according to the network policies received from controller cards the 1904A-B. In one embodiment, the controller cards 1904A-B write data to the dynamic shared memory hash table using reader notifications as described in FIGS. 8-10 above. In this embodiment, one or both of the controller cards include a writer hash module to write data to the shared memory hash table using reader notifications, such as the writer 108 as described in FIG. 1 above. In another embodiment, the line cards 1902A-N read data from the dynamic shared memory hash table using notifications as described in FIG. 11. In this embodiment, one or more of the line cards 1902A-N include the reader hash module to read data from the shared memory hash table using notifications, such as the reader 112A-C as described in FIG. 1 above. It should be understood that the architecture of the network element 1900 illustrated in FIG. 19 is exemplary, and different combinations of cards may be used in other embodiments of the invention.

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "storing," "deleting," "determining," "copying," "reading," "updating," "adding," "remapping," "receiving," "publishing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A non-transitory machine-readable medium having executable instructions to cause one or more processing units to perform a method comprising:
   starting a reader in a data plane of a network device to read routing information from a shared table, wherein the network device receives and forwards network data, and the routing information is written to the shared table by a writer in a control plane of the network device;
   synchronizing a local table stored in the local memory of the reader with the shared table, wherein the reader processes notifications in a notification queue to update the local table with the changes, the writer stores the notifications in the notification queue, and the notifications indicate changes the writer made to data stored in the shared table;
   determining if the notification queue has been modified; and
   resynchronizing the local table with the shared table in response to determining the notification queue has been modified.

2. The non-transitory machine-readable medium of claim 1, wherein the synchronizing comprises:
   reading a shared maximum sequence number;
   storing the shared maximum sequence number locally;
   copying data from the shared table to the local table; and
   assigning the locally stored shared maximum sequence number to a last sequence number of the reader.

3. The non-transitory machine-readable medium of claim 1, wherein the resynchronizing comprises:
   copying data from the shared table to the local table.

4. The non-transitory machine-readable medium of claim 1, wherein a plurality of readers accesses the notifications.

5. The non-transitory machine-readable medium of claim 1, wherein the determining comprises:
reading a shared minimum sequence number;
comparing the shared minimum sequence number with a last sequence number of the reader, wherein the notification queue has been modified if the shared minimum sequence number is greater than the last sequence number.

6. The non-transitory machine-readable medium of claim 5, wherein the last sequence number of a reader comprises a sequence of the last slot in the notification queue that has been processed by that reader.

7. The non-transitory machine-readable medium of claim 6, wherein the shared minimum sequence number indicates that notifications that have a sequence number higher than the shared minimum sequence number are available in the notification queue.

8. The non-transitory machine-readable medium of claim 5, wherein the last sequence number of a reader comprises a local maximum sequence number snapshot of the reader prior to slot table synchronizing.

9. The non-transitory machine-readable medium of claim 5, further comprising:
removing notifications that have a sequence number that are less than or equal to the lowest of the last sequence numbers received from each reader; and
increasing the shared minimum sequence number to that lowest last sequence number.

10. The non-transitory machine-readable medium of claim 1, further comprising:
processing notifications in the notification queue in response to determining that the notification queue has not been modified.

11. The non-transitory machine-readable medium of claim 1, wherein the shared table comprises one or more of a hash table, a tree, and a vector.

12. The non-transitory machine-readable medium of claim 1, wherein the notification queue has been modified when the notification queue has been pruned such that the reader cannot update the local table with each of the changes the writer has made to data stored in the shared table.

13. A method comprising:
starting a reader in a data plane of a network device to read routing information from a shared table, wherein the network device receives and forwards network data, and the routing information is written to the shared table by a writer in a control plane of the network device;
synchronizing a local table stored in the local memory of the reader with the shared table, wherein the reader processes notifications in a notification queue to update the local table with the changes, the writer stores the notifications in the notification queue, and the notifications indicate changes the writer made to data stored in the shared table;
determining if the notification queue has been modified; and
resynchronizing the local table with the shared table in response to determining the notification queue has been modified.

14. The method of claim 13, wherein the synchronizing comprises:
reading a shared maximum sequence number;
storing the shared maximum sequence number locally;
copying data from the shared table to the local table; and
assigning the locally stored shared maximum sequence number to a last sequence number of the reader.

15. The method of claim 13, wherein the resynchronizing comprises:
copying data from the shared table to the local table.

16. The method of claim 13, wherein a plurality of readers accesses the notifications.

17. The method of claim 13, wherein the determining comprises:
reading a shared minimum sequence number;
comparing the shared minimum sequence number with a last sequence number of the reader, wherein the notification queue has been modified if the shared minimum sequence number is greater than the last sequence number.

18. The method of claim 17, wherein the last sequence number of a reader comprises a sequence of the last slot in the notification queue that has been processed by that reader.

19. The method of claim 18, wherein the shared minimum sequence number indicates that notifications that have a sequence number higher than the shared minimum sequence number are available in the notification queue.

20. The method of claim 17, wherein the last sequence number of a reader comprises a local maximum sequence number snapshot of the reader prior to slot table synchronizing.

21. The method of claim 17, further comprising:
removing notifications that have a sequence number that are less than or equal to the lowest of the last sequence numbers received from each reader; and
increasing the shared minimum sequence number to that lowest last sequence number.

22. The method of claim 13, further comprising:
processing notifications in the notification queue in response to determining that the notification queue has not been modified.

23. The method of claim 13, wherein the shared table comprises one or more of a hash table, a tree, and a vector.

24. The method of claim 13, wherein the notification queue has been modified when the notification queue has been pruned such that the reader cannot update the local table with each of the changes the writer has made to data stored in the shared table.

25. A network device, comprising:
a memory to store data;
a processing device coupled to the memory, the processing device to:
start a reader in a data plane of the network device to read routing information from a shared table, wherein the network device receives and forwards network data, and the routing information is written to the shared table by a writer in a control plane of the network device;
synchronize a local table stored in the local memory of the reader with the shared table, wherein the reader processes notifications in a notification queue to update the local table with the changes, the writer stores the notifications in the notification queue, and the notifications indicate changes the writer made to data stored in the shared table;
determine if the notification queue has been modified; and
resynchronize the local table with the shared table in response to determining the notification queue has been modified.

26. The network device of claim 25, wherein to synchronize the shared table with the local table the processing device is further to:

read a shared maximum sequence number;
store the shared maximum sequence number locally;
copy data from the shared table to the local table; and
assign the locally stored shared maximum sequence number to a last sequence number of the reader.

27. The network device of claim 25, wherein to resynchronize the local table with the shared table the processing device is to:
copy data from the shared table to the local table.

28. The network device of claim 25, wherein a plurality of readers accesses the notifications.

29. The network device of claim 25, wherein to determine if the notification queue has been modified the processing device is further to:
read a shared minimum sequence number;
compare the shared minimum sequence number with a last sequence number of the reader, wherein the notification has been modified if the shared minimum sequence number is greater than the last sequence number.

30. The network device of claim 29, wherein the last sequence number of a reader comprises a sequence of the last slot in the notification queue that has been processed by that reader.

31. The network device of claim 30, wherein the shared minimum sequence number indicates that notifications that have a sequence number higher than the shared minimum sequence number are available in the notification queue.

32. The network device of claim 29, wherein the last sequence number of a reader comprises a local maximum sequence number snapshot of the reader prior to slot table synchronizing.

33. The network device of claim 29, wherein the processing device is further to:
remove notifications that have a sequence number that are less than or equal to the lowest of the last sequence numbers received from each reader; and
increasing the shared minimum sequence number to that lowest last sequence number.

34. The network device of claim 25, wherein the processing device is further to:
process notifications in the notification queue in response to determining that the notification queue has not been modified.

35. The network device of claim 25, wherein the shared table comprises one or more of a hash table, a tree, and a vector.

36. The network device of claim 25, wherein the notification queue has been modified when the notification queue has been pruned such that the reader cannot update the local table with each of the changes the writer has made to data stored in the shared table.

* * * * *